(12) United States Patent
Li et al.

(10) Patent No.: US 10,743,025 B2
(45) Date of Patent: Aug. 11, 2020

(54) METHOD AND APPARATUS FOR PERFORMING TRANSFORMATION USING LAYERED GIVENS TRANSFORM

(71) Applicant: LG ELECTRONICS INC., Seoul (KR)

(72) Inventors: Bohan Li, San Jose, CA (US); Arash Vosoughi, San Jose, CA (US); Onur G. Guleryuz, San Jose, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/329,624

(22) PCT Filed: Sep. 1, 2017

(86) PCT No.: PCT/KR2017/009615
§ 371 (c)(1),
(2) Date: Jul. 31, 2019

(87) PCT Pub. No.: WO2018/044125
PCT Pub. Date: Aug. 3, 2018

(65) Prior Publication Data
US 2019/0349602 A1 Nov. 14, 2019

Related U.S. Application Data

(60) Provisional application No. 62/382,759, filed on Sep. 1, 2016.

(51) Int. Cl.
*H04N 19/60* (2014.01)
*H04N 19/88* (2014.01)
(Continued)

(52) U.S. Cl.
CPC ............... *H04N 19/60* (2014.11); *G06F 7/78* (2013.01); *H04N 19/88* (2014.11); *H04N 19/91* (2014.11)

(58) Field of Classification Search
CPC ........ H04N 19/60; H04N 19/88; H04N 19/91; G06F 7/78
See application file for complete search history.

(56) References Cited

U.S. PATENT DOCUMENTS

| 2004/0049379 A1* | 3/2004 | Thumpudi | G10L 19/008 704/205 |
| 2007/0196022 A1* | 8/2007 | Geiger | G06F 17/147 382/232 |

(Continued)

FOREIGN PATENT DOCUMENTS

| KR | 10-0776235 B1 | 11/2007 |
| KR | 10-2013-0116924 A | 10/2013 |
| KR | 10-1362696 B1 | 2/2014 |

OTHER PUBLICATIONS

Jie Liang and T. D. Tran, "Approximating the DCT with the lifting scheme: systematic design and applications," Conference Record of the Thirty-Fourth Asilomar Conference on Signals, Systems and Computers (Cat. No. 00CH37154), Pacific Grove, CA, USA, 2000, pp. 192-196 vol. 1. (Year: 2000).*

(Continued)

*Primary Examiner* — Jeremiah C Hallenbeck-Huber
(74) *Attorney, Agent, or Firm* — Dentons US LLP

(57) ABSTRACT

The present invention provides a method for performing transformation using a layered Givens transform (LGT), comprising the steps of: deriving at least one rotation layer and at least one permutation layer on the basis of a given transform matrix (H) and a given error parameter; acquiring a LGT coefficient on the basis of the rotation layer and the permutation layer; and quantizing and entropy-encoding the LGT coefficient, wherein the permutation layer comprises a permutation matrix obtained by permuting a row of an identity matrix.

16 Claims, 21 Drawing Sheets

(51) Int. Cl.
*H04N 19/91* (2014.01)
*G06F 7/78* (2006.01)

(56) References Cited

U.S. PATENT DOCUMENTS

| | | | | |
|---|---|---|---|---|
| 2008/0112504 A1* | 5/2008 | Jiang | ............... | H04L 1/0618 |
| | | | | 375/296 |
| 2008/0317172 A1* | 12/2008 | Zhang | ............... | H04B 7/0413 |
| | | | | 375/340 |
| 2010/0318368 A1* | 12/2010 | Thumpudi | ............ | G10L 19/008 |
| | | | | 704/500 |
| 2012/0281753 A1* | 11/2012 | Misra | ............... | H04N 19/102 |
| | | | | 375/240.03 |
| 2015/0055697 A1 | 2/2015 | Wu et al. | | |
| 2016/0219290 A1 | 7/2016 | Zhao et al. | | |

OTHER PUBLICATIONS

R. Geiger, Y. Yokotani, G. Schuller and J. Herre, "Improved integer transforms using multi-dimensional lifting [audio coding examples]," 2004 IEEE International Conference on Acoustics, Speech, and Signal Processing, Montreal, Que., 2004, pp. ii-1005. (Year: 2004).*

* cited by examiner

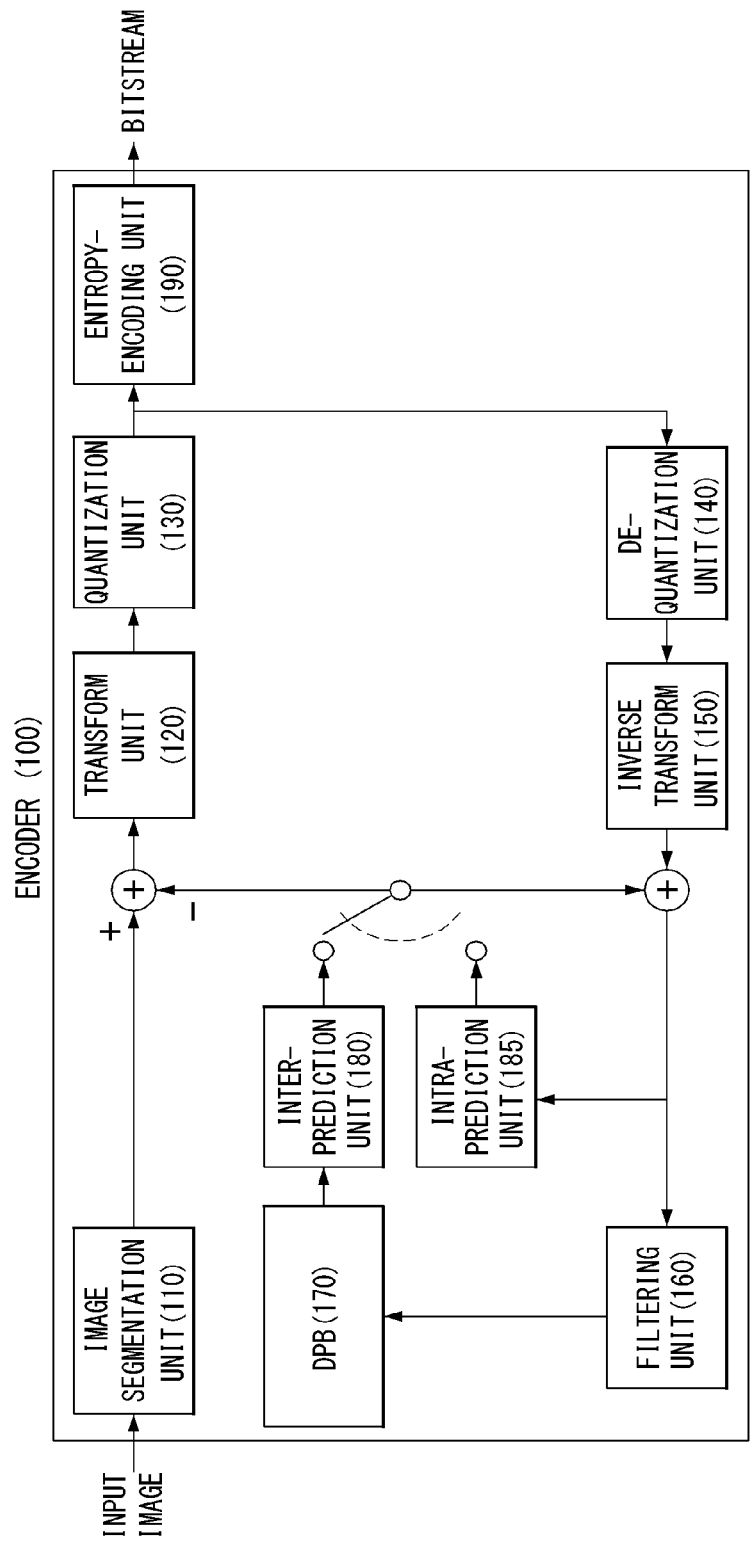
[Fig. 1]

[Fig. 2]
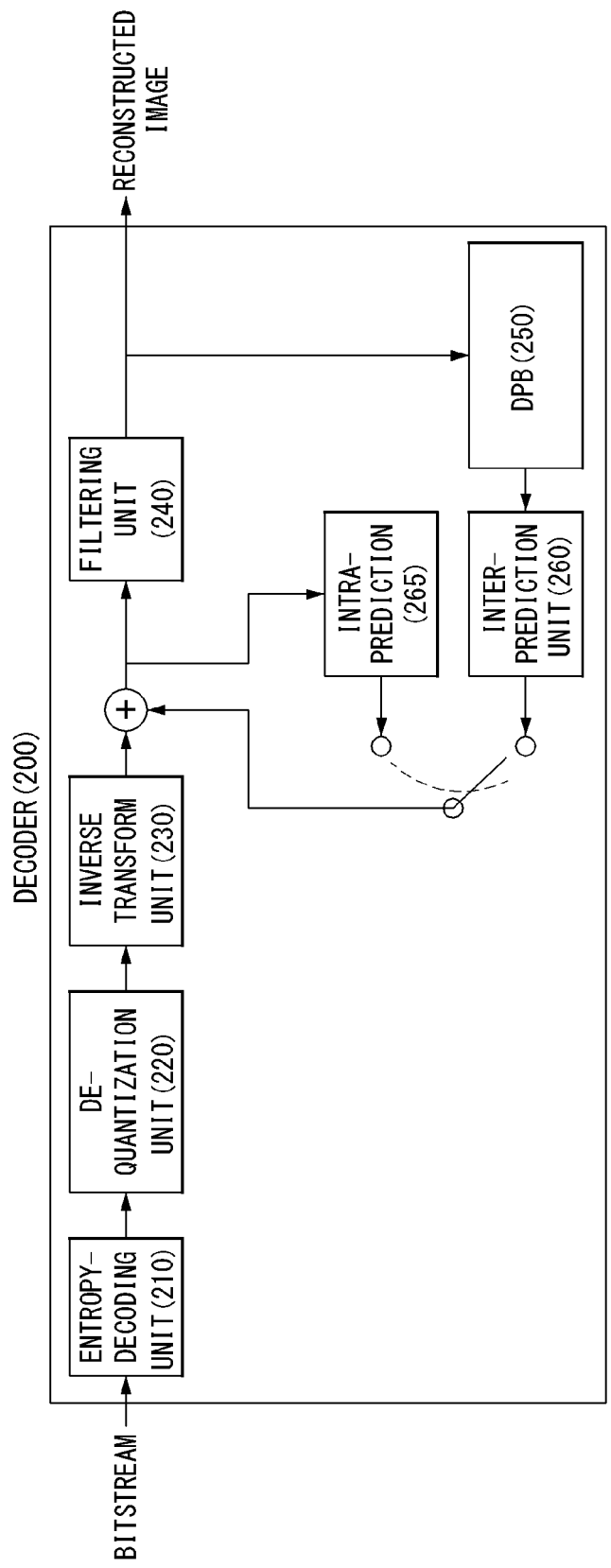

[Fig. 3]
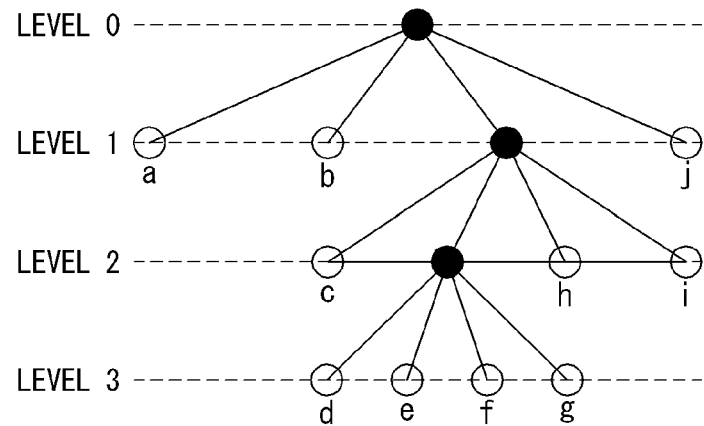
(a)
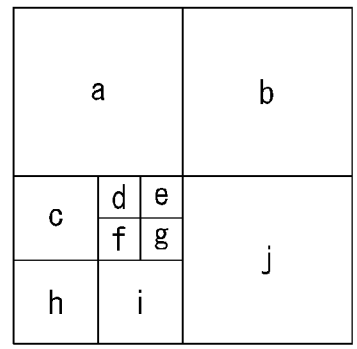
(b)

[Fig. 4]
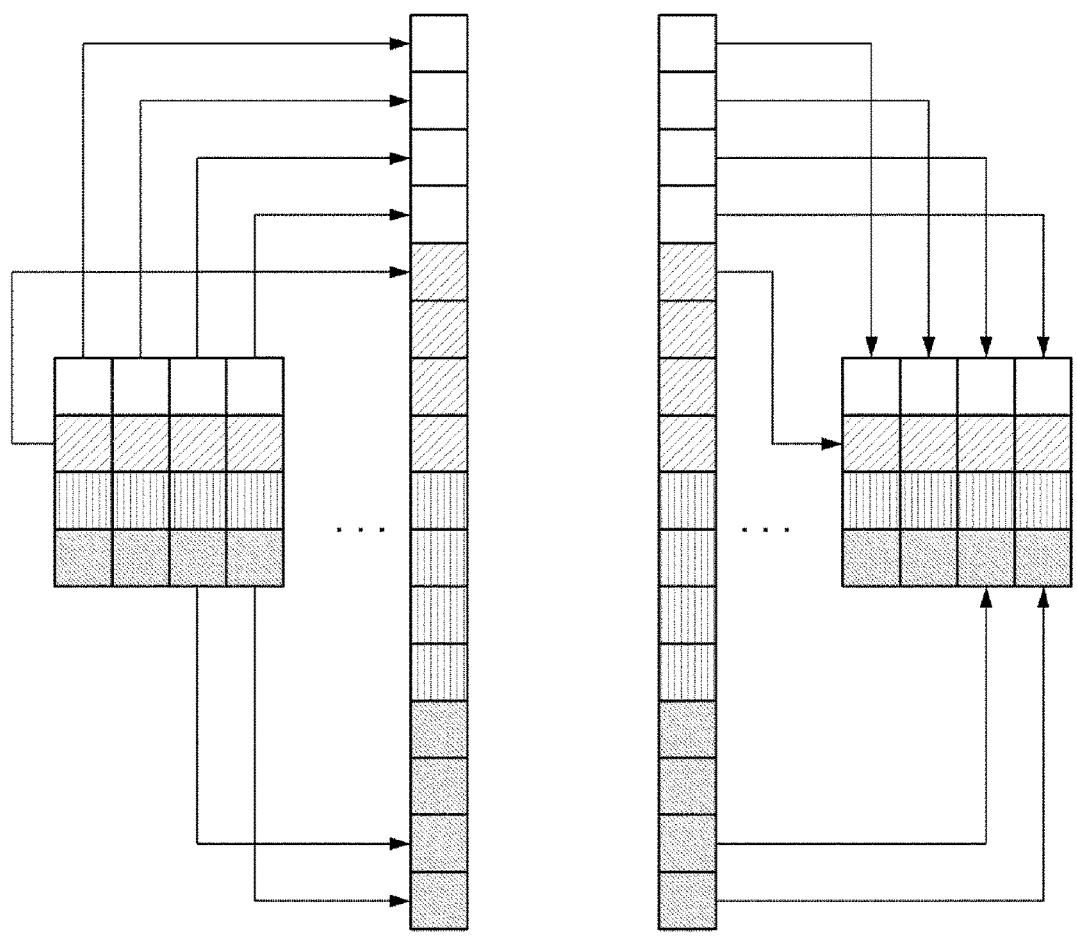

[Fig. 5]
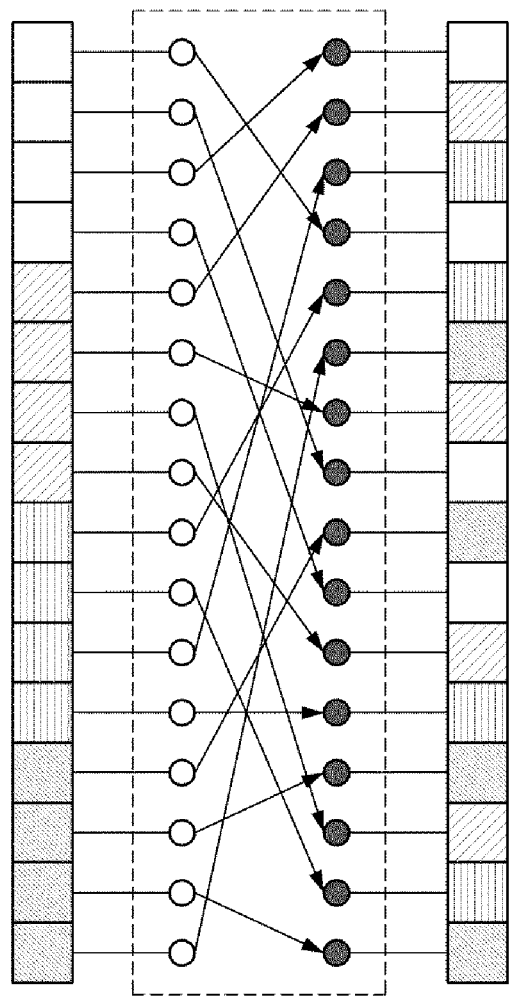

[Fig. 6]
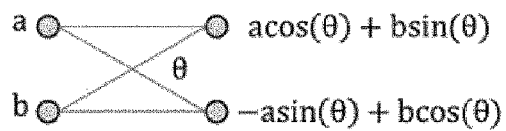
(a)
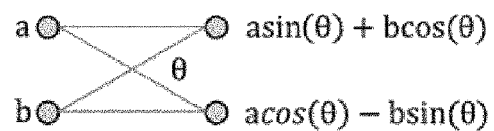
(b)

[Fig. 7]
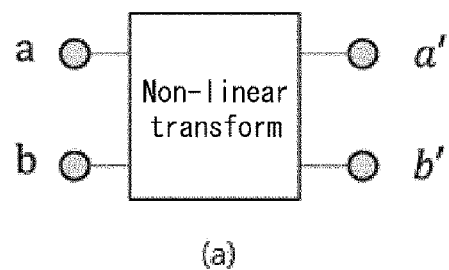
(a)
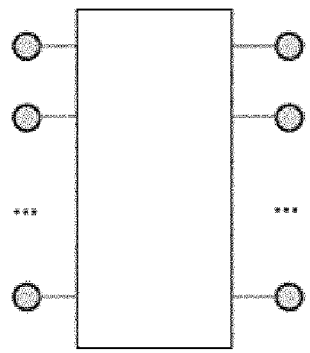
(b)

[Fig. 8]
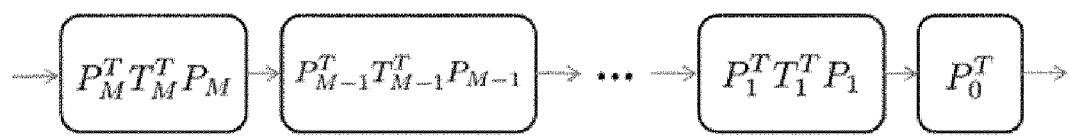
(a)
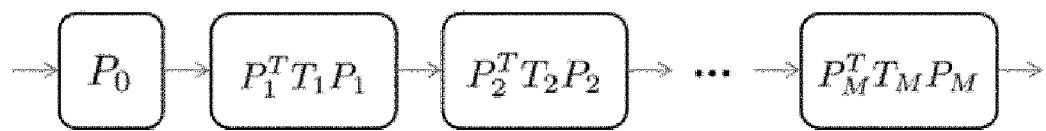
(b)

[Fig. 9]
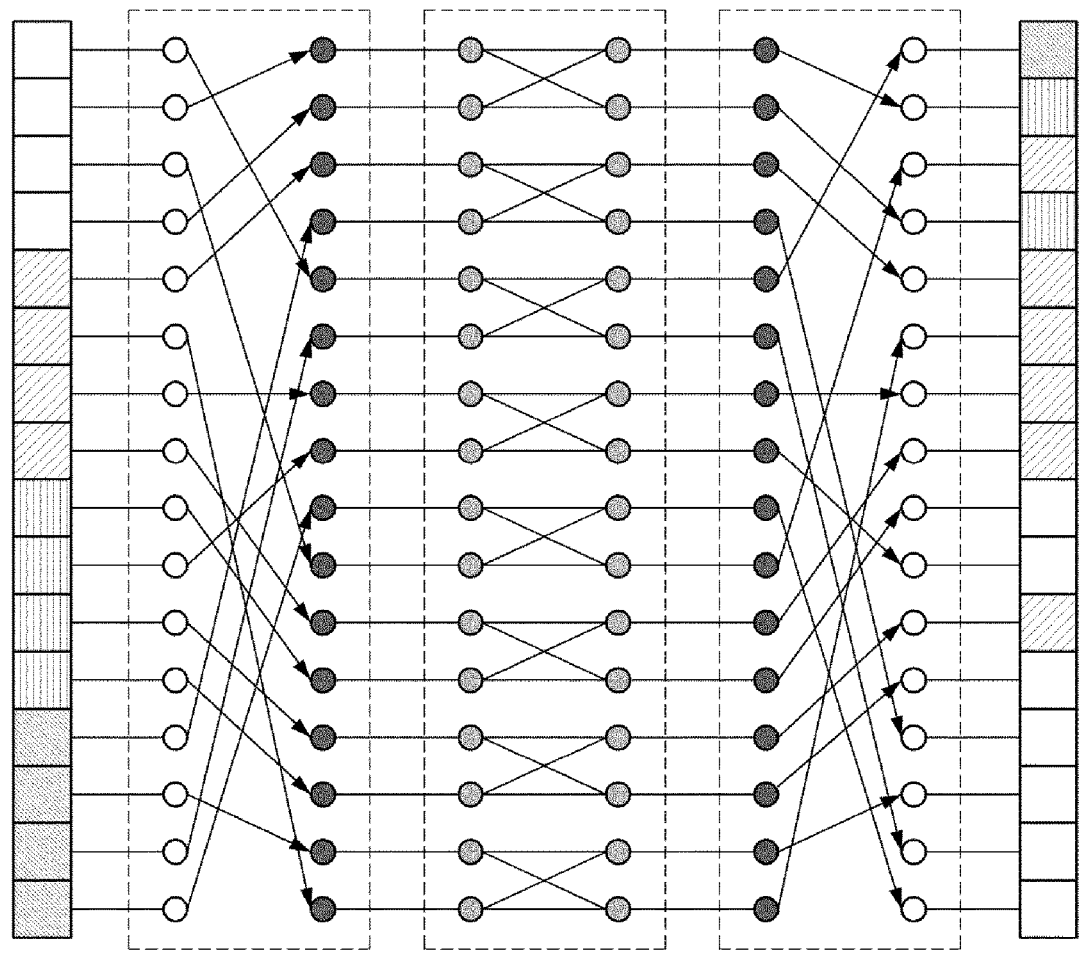

[Fig. 10]
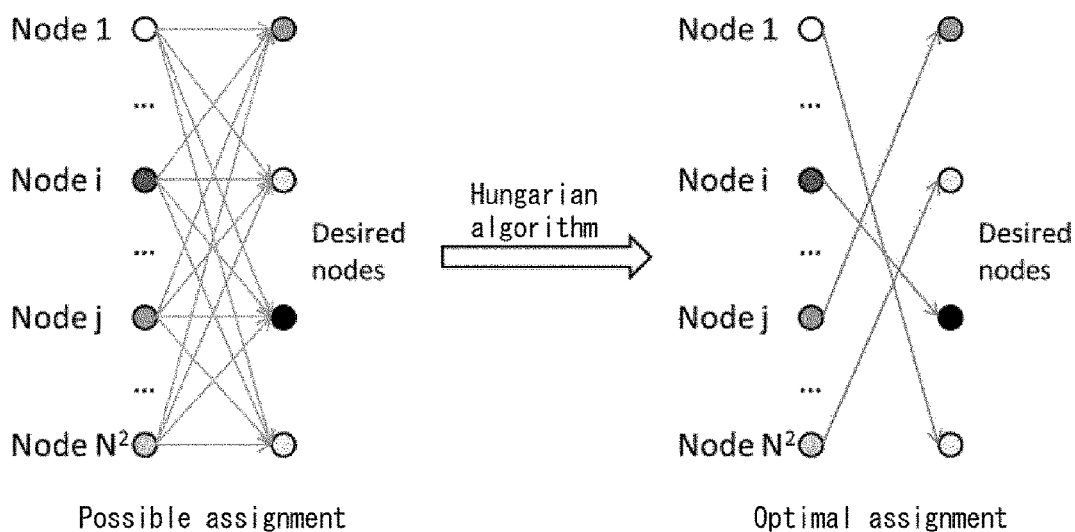

[Fig. 11]
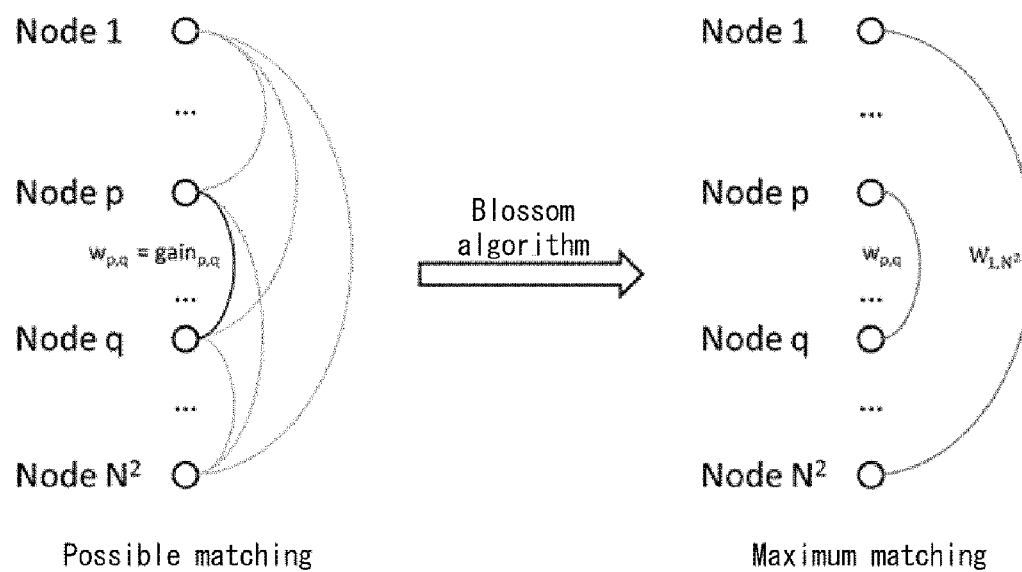

[Fig. 12]
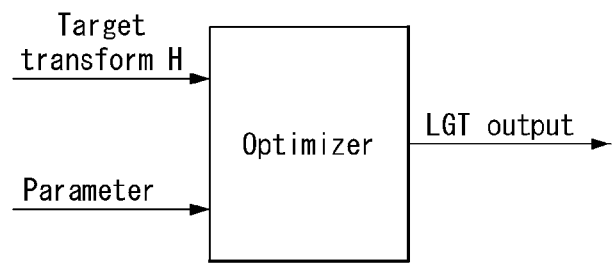

[Fig. 13]
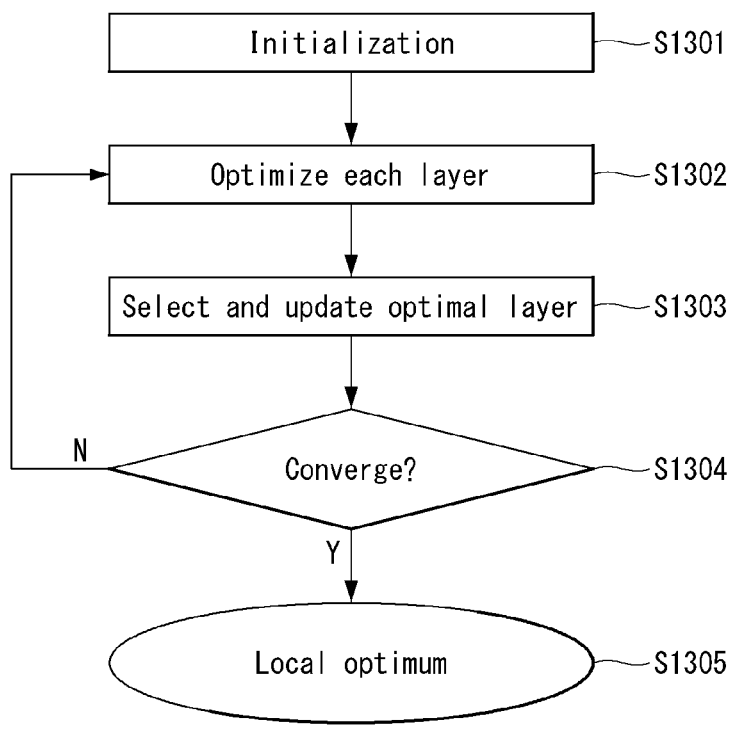

[Fig. 14]
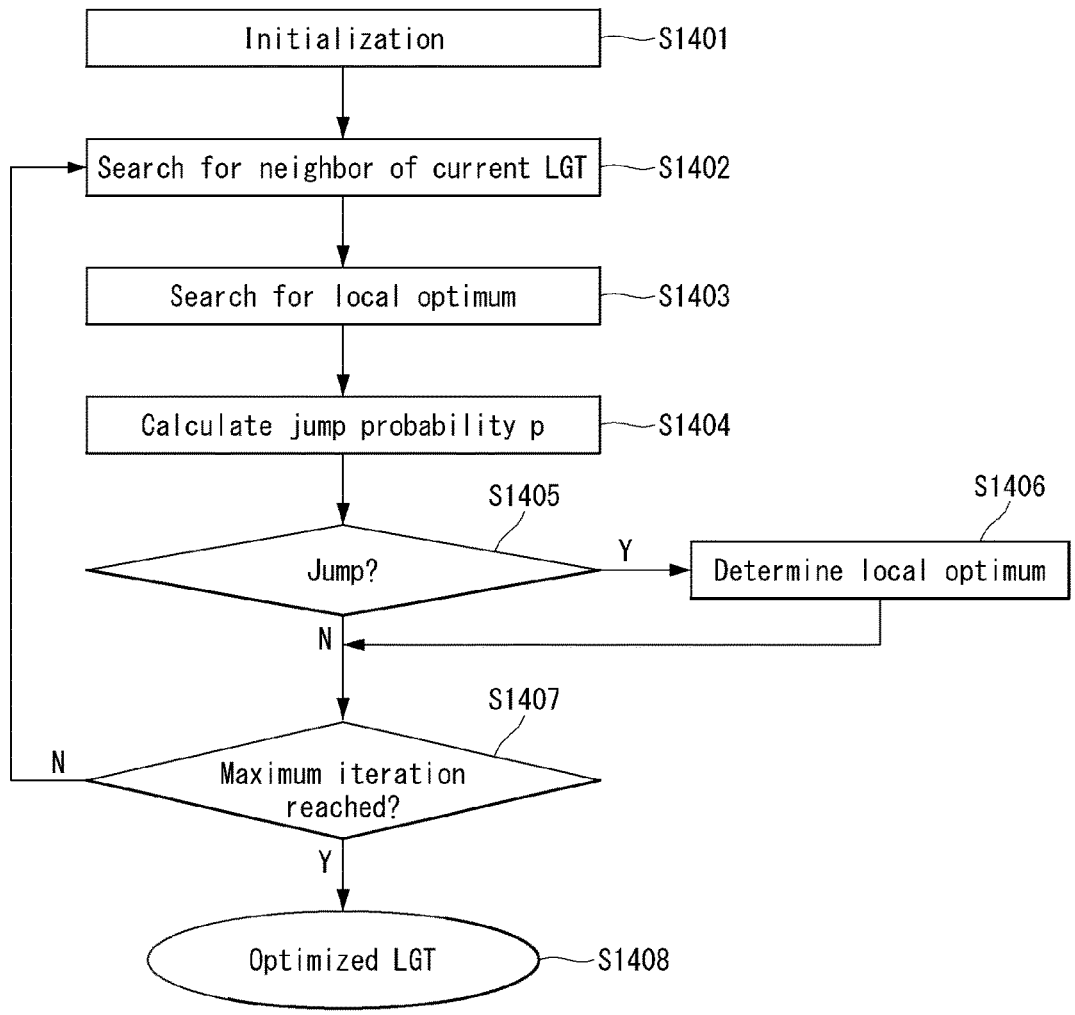

[Fig. 15]
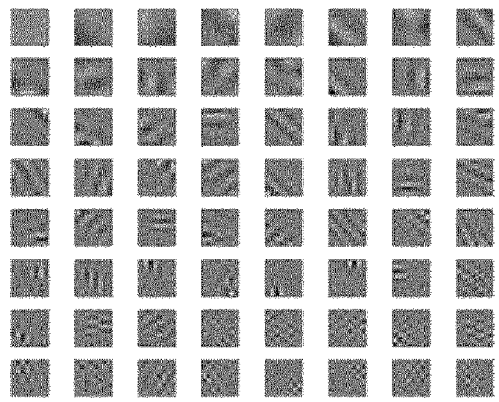
(a) Non-separable target basis
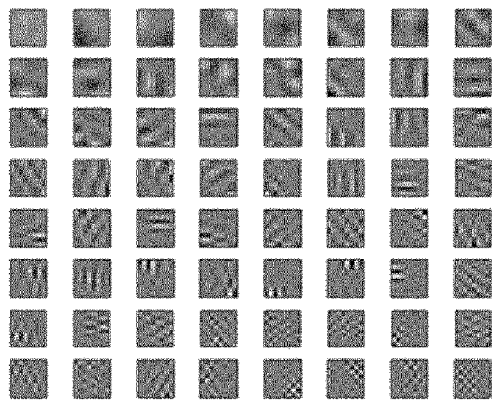
(b) IGT approximation
SNR = 8.70 dB
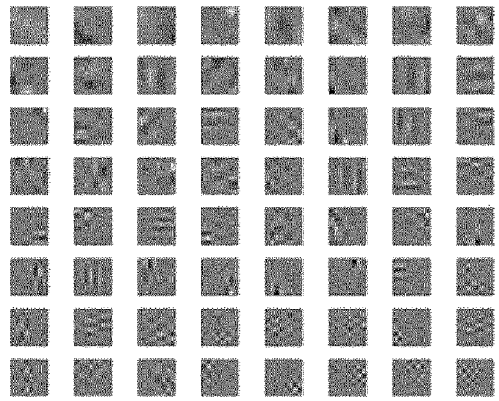
(c) RC approximation
SNR = 3.85 dB
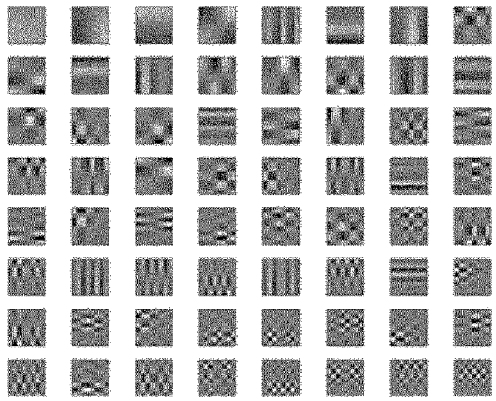
(d) Separable approximation
SNR = 0.28 dB

[Fig. 16]
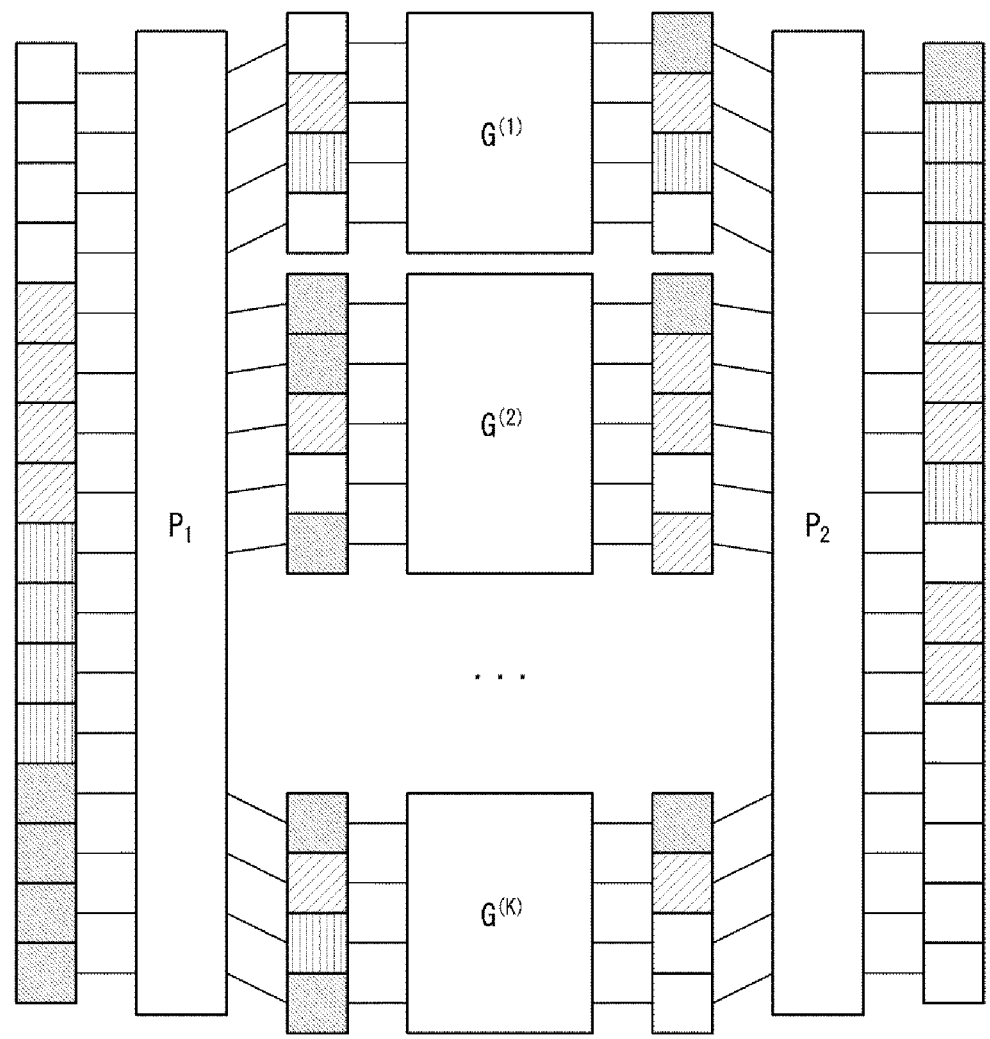

[Fig. 17]
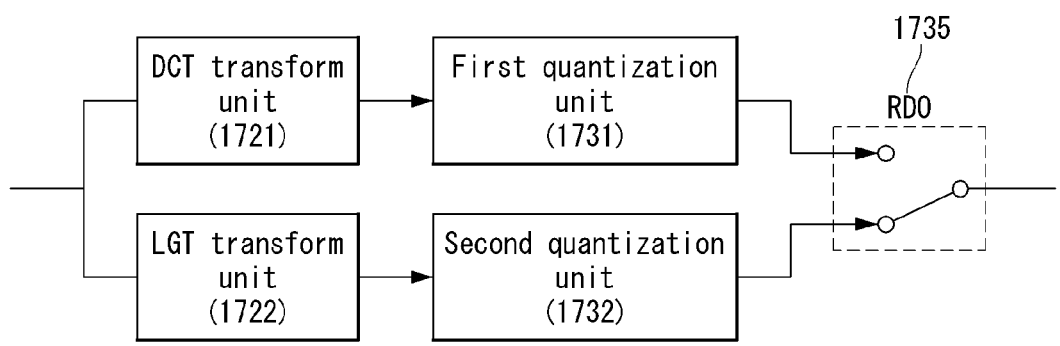

[Fig. 18]
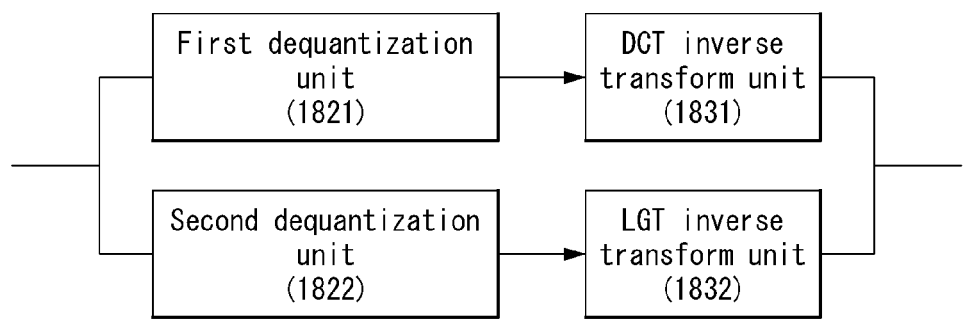

[Fig. 19]
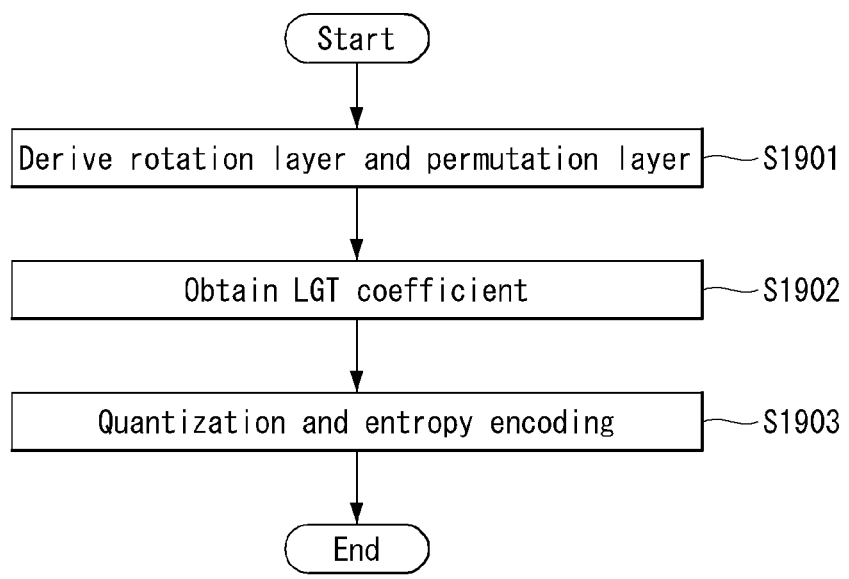

[Fig. 20]
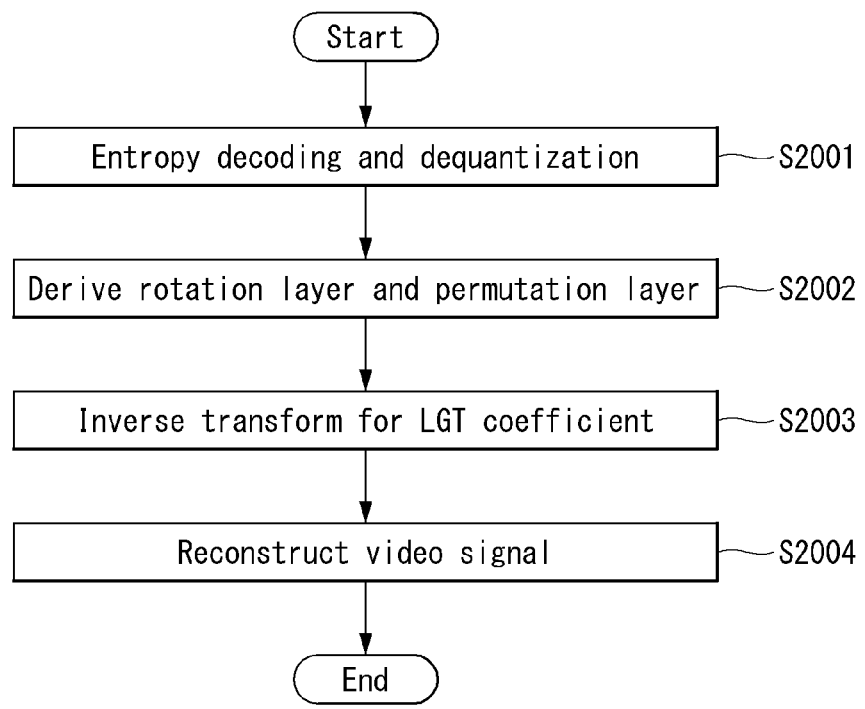

[Fig. 21]
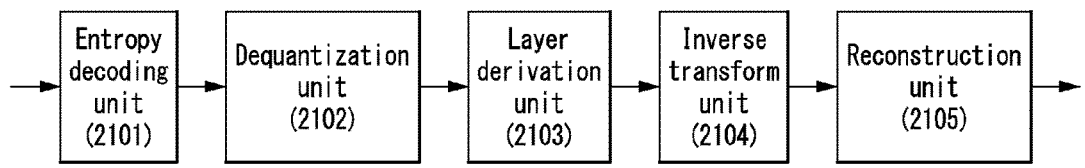

METHOD AND APPARATUS FOR PERFORMING TRANSFORMATION USING LAYERED GIVENS TRANSFORM

TECHNICAL FIELD

The present invention relates to a method and apparatus for encoding/decoding a video signal and, more particularly, to a technology for approximating a given target transform using a layered Givens transform.

BACKGROUND ART

Compression encoding means a series of signal processing technologies for transmitting digitized information through a communication line or storing the information in a form suitable for a storage medium. Media, such as a picture, an image and voice, may be the subject of compression encoding. In particular, a technology performing compression encoding on an image is called video image compression.

Next-generation video content will have features of high spatial resolution, a high frame rate, and high dimensionality of scene representation. Processing such content will result in a tremendous increase in terms of memory storage, a memory access rate, and processing power. Therefore, there is a need to design a coding tool for processing next-generation video content more efficiently.

In particular, many image processing and compressing schemes have adapted separable transforms. For example, a Discrete Cosine Transform (DCT) provides good approximation to a Karhunen-Loeve transform (KLT) in response to a high inter pixel correlation, and it is used widely due to low complexity. Regardless of use of separable transforms, natural image compression has very different statistical properties, so better compression may be performed only by means of a complex transform applicable to variable statistical properties of signal blocks.

Actual implementations have been so far focused on separable approximation of such transforms in order to provide a low-complex reasonable coding gain. For example, a mode-dependent transform scheme is designed such that a separable KLT reduces complexity of a non-separable KLT for each mode. In another example, an asymmetric discrete sine transform (ADST) is integrated into a hybrid DCT/ADST scheme and designing a separable sparse orthonormal transform and the like has been considered.

DISCLOSURE

Technical Problem

An object of the present invention proposes a method of designing a transform having significantly low computational complexity while showing compression performance similar to a target transform of high computational complexity.

Furthermore, an object of the present invention proposes a method of designing a layered Givens transform (LGT) approximate to a target transform when the target transform is given.

Furthermore, an object of the present invention proposes a method of approximating a non-separable transform using a layered Givens transform (LGT).

Furthermore, an object of the present invention proposes a method of performing optimization for each layer in order to design a layered Givens transform (LGT).

Furthermore, an object of the present invention proposes a method of optimizing layers configuring a layered Givens transform (LGT) using a Hungarian algorithm and a blossom algorithm.

Technical objects to be achieved in the present invention are not limited to the aforementioned object, and those skilled in the art to which the present invention pertains may evidently understand other technological objects from the following description.

Technical Solution

In an aspect of the present invention, a method of performing a transform using a layered Givens transform includes deriving at least one rotation layer and permutation layer based on a given transform matrix H and error parameter, obtaining a layered Givens transform (LGT) coefficient based on the rotation layer and the permutation layer, and performing quantization and entropy encoding on the LGT coefficient. The permutation layer may include a permutation matrix obtained by substituting a row of an identity matrix.

Preferably, the rotation layer may include a permutation matrix and a rotation matrix, and the rotation matrix may include at least one pairwise rotation matrix.

Preferably, the rotation layer or the permutation layer may be derived through an optimization process. The optimization process may be performed based on matching between a layered Givens transform (LGT) matrix and the given transform matrix H. The layered Givens transform (LGT) matrix may be derived using the rotation layer and the permutation layer.

Preferably, the optimization process of the permutation layer may be performed using a Hungarian algorithm.

Preferably, the optimization process of the rotation layer may include determining an optimal rotation angle of a rotation matrix within the rotation layer based on the matching between the LGT matrix and the given transform matrix H and determining non-overlapped pairs maximizing a total sum of gains determined based on the optimal rotation angle.

Preferably, the non-overlapped pairs maximizing the total sum of gains may be determined using a blossom algorithm.

Preferably, the optimization process of the rotation layer may further include setting at least one different rotation layer within the LGT matrix as an identity matrix.

Preferably, obtaining the LGT coefficient may include obtaining the LGT coefficient by applying the rotation layer and the permutation layer to input data arranged in lexicographic order.

In another aspect of the present invention, a method of performing an inverse transform using a layered Givens transform includes obtaining a layered Givens transform (LGT) coefficient by performing entropy decoding and dequantization on a residual signal included in a video signal, deriving at least one rotation layer and permutation layer based on a given transform matrix H and error parameter, performing an inverse transform on the LGT coefficient based on the rotation layer and the permutation layer, and reconstructing the video signal using the inverse-transformed coefficient. The permutation layer may include a permutation matrix obtained by substituting a row of an identity matrix.

Preferably, the rotation layer may include a permutation matrix and a rotation matrix. The rotation matrix may include at least one pairwise rotation matrix.

Preferably, the rotation layer or the permutation layer may be derived through an optimization process. The optimization process may be performed based on matching between a layered Givens transform (LGT) matrix and the given transform matrix H. The layered Givens transform (LGT) matrix may be derived using the rotation layer and the permutation layer.

Preferably, the optimization process of the permutation layer may be performed using a Hungarian algorithm.

Preferably, the optimization process of the rotation layer may include determining an optimal rotation angle of a rotation matrix within the rotation layer based on the matching between the LGT matrix and the given transform matrix H and determining non-overlapped pairs maximizing a total sum of gains determined based on the optimal rotation angle.

Preferably, the non-overlapped pairs maximizing the total sum of gains may be determined using a blossom algorithm.

Preferably, the optimization process of the rotation layer may further include setting at least one different rotation layer within the LGT matrix as an identity matrix.

In an aspect of the present invention, an apparatus performing an inverse transform using a layered Givens transform may include an entropy decoding unit configured to perform entropy-decode a residual signal included in a video signal, a dequantization unit configured to obtain a layered Givens transform (LGT) coefficient by dequantizing the entropy-decoded residual signal, a layer derivation unit configured to derive at least one rotation layer and permutation layer based on a given transform matrix H and error parameter, an inverse transform unit configured to perform an inverse transform on the LGT coefficient based on the rotation layer and the permutation layer, and a reconstruction unit configured to reconstruct the video signal using the inverse-transformed coefficient. The permutation layer may include a permutation matrix obtained by substituting a row of an identity matrix.

Advantageous Effects

In accordance with an embodiment of the present invention, coding performance can be improved by designing a transform having the same or similar compression efficiency as or to a given target transform in significantly reduced computational complexity compared to the target transform.

Effects which may be obtained in the present invention are not limited to the aforementioned effects, and various other effects may be evidently understood by those skilled in the art to which the present invention pertains from the following description.

DESCRIPTION OF DRAWINGS

FIG. 1 shows a schematic block diagram of an encoder for encoding a video signal according to one embodiment of the present invention.

FIG. 2 shows a schematic block diagram of a decoder for decoding a video signal according to one embodiment of the present invention.

FIG. 3 is a diagram for illustrating a split structure of a coding unit according to one embodiment of the present invention.

FIG. 4 is an embodiment to which the present invention is applied and is a diagram illustrating a method of arranging two-dimensional data blocks in the form of a one-dimensional array.

FIG. 5 is an embodiment to which the present invention is applied and is a diagram illustrating an example in which a permutation matrix is applied.

FIG. 6 is an embodiment to which the present invention is applied and is a diagram illustrating an example in which a rotation matrix is applied.

FIG. 7 is a diagram illustrating an example of a transform to which the present invention is applied.

FIG. 8 is an embodiment to which the present invention is applied and is a diagram illustrating a method of applying forward and backward layered Givens transforms.

FIG. 9 is an embodiment to which the present invention is applied and is a diagram illustrating a method of applying a rotation layer.

FIG. 10 is an embodiment to which the present invention is applied and is a diagram illustrating a method of determining a permutation layer using a Hungarian algorithm.

FIG. 11 is an embodiment to which the present invention is applied and is a diagram illustrating a method of determining a rotation layer using a blossom algorithm.

FIG. 12 is an embodiment to which the present invention is applied and is a conceptual view for illustrating a method of optimizing a layered Givens transform.

FIGS. 13 and 14 are embodiments to which the present invention is applied and are flowcharts for illustrating an algorithm for designing a layered Givens transform.

FIG. 15 is an embodiment to which the present invention is applied and shows approximations by an LGT transform, a row-column transform and a separable transform.

FIG. 16 is an embodiment to which the present invention is applied and is a diagram illustrating an example of a method of applying a reduced dimensional LGT.

FIG. 17 is a diagram illustrating a schematic block diagram of a transform unit and quantization unit within an encoder to which the present invention is applied.

FIG. 18 is a diagram illustrating a schematic block diagram of an inverse transform unit and dequantization unit within a decoder to which the present invention is applied.

FIG. 19 is an embodiment to which the present invention is applied and is a flowchart for illustrating a process of performing encoding using a layered Givens transform.

FIG. 20 is an embodiment to which the present invention is applied and is a flowchart for illustrating a process of performing decoding a layered Givens transform.

FIG. 21 is a diagram illustrating, more specifically, a decoder to which the present invention is applied.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical ideas and core elements and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly substituted and interpreted in each coding process. Further, partitioning, decomposition, splitting, and split, etc. may also be appropriately substituted and interpreted with each other for each coding process.

FIG. 1 shows a schematic block diagram of an encoder for encoding a video signal, according to one embodiment of the present invention.

Referring to FIG. 1, the encoder 100 may include an image segmentation unit 110, a transform unit 120, a quantization unit 130, a de-quantization unit 140, an inverse transform unit 150, a filtering unit 160, a decoded picture buffer (DPB) 170, an inter prediction unit 180, an intra prediction unit 185, and an entropy encoding unit 190.

The image segmentation unit 110 may divide an input image (or a picture or a frame) input to the encoder 100 into one or more process units. For example, the process unit may be a coding tree unit (CTU), a coding unit (CU), a prediction unit (PU) or a transform unit (TU).

However, the terms are used only for convenience of illustration of the present invention. The present invention is not limited to the definitions of the terms. In this specification, for convenience of illustration, the term "coding unit" is used as a unit used in a process of encoding or decoding a video signal, but the present invention is not limited thereto. Another process unit may be appropriately selected based on the contents of the present invention.

The encoder 100 may generate a residual signal by subtracting a prediction signal output by the inter prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square or to a block of a variable size other than a square.

The quantization unit 130 quantizes the transform coefficient and transmits the quantized coefficient to the entropy encoding unit 190. The entropy encoding unit 190 may entropy-encode a quantized signal and output it as a bit stream.

The quantized signal output by the quantization unit 130 may be used to generate a prediction signal. For example, the quantized signal may reconstruct a residual signal by applying dequantization and an inverse transform through the dequantization unit 140 and the inverse transform unit 150 within the loop. A reconstructed signal may be generated by adding the reconstructed residual signal to the prediction signal output by the inter-prediction unit 180 or the intra-prediction unit 185.

Meanwhile, in such a compression process, artifacts in which a block boundary appears due to a quantization error because quantization is performed in a block unit may occur. Such a phenomenon are called blocking artifacts, which is one of important elements that evaluate picture quality. A filtering process may be performed in order to reduce such artifacts. Through such a filtering process, picture quality can be enhanced by removing blocking artifacts and also reducing an error of a current picture.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter prediction unit 180.

The inter prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter prediction unit 180 may interpolate signals between pixels on a subpixel basis using a low-pass filter. In this case, the subpixel may mean a virtual pixel generated by applying an interpolation filter. An integer pixel means an actual pixel within the reconstructed picture. The interpolation method may include linear interpolation, bi-linear interpolation and Wiener filter, etc.

The interpolation filter may be applied to the reconstructed picture to improve the accuracy of the prediction. For example, the inter prediction unit 180 may apply the interpolation filter to integer pixels to generate interpolated pixels. The inter prediction unit 180 may perform prediction using an interpolated block composed of the interpolated pixels as a prediction block.

Meanwhile, the intra prediction unit 185 may predict a current block by referring to samples in the vicinity of a block to be encoded currently. The intra prediction unit 185 may perform a following procedure to perform intra-prediction. First, the intra prediction unit 185 may prepare reference samples needed to generate a prediction signal. Thereafter, the intra prediction unit 185 may generate the prediction signal using the prepared reference samples. Thereafter, the intra prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter prediction unit 180 or the intra prediction unit 185 may be used to generate the reconstructed signal or used to generate the residual signal.

FIG. 2 shows a schematic block diagram of a decoder for decoding a video signal according to one embodiment of the present invention.

Referring to FIG. 2, the decoder 200 may include a parsing unit (not shown), an entropy decoding unit 210, a de-quantization unit 220, an inverse transform unit 230, a filtering unit 240, a decoded picture buffer (DPB) 250, an inter prediction unit 260 and an intra prediction unit 265.

A reconstructed video signal output by the decoder 200 may be reproduced using a playback device.

The decoder 200 may receive the signal output by the encoder as shown in FIG. 1. The received signal may be entropy-decoded via the entropy decoding unit 210.

The de-quantization unit 220 obtains a transform coefficient from an entropy-decoded signal using quantization step size information.

The inverse transform unit 230 obtains a residual signal by performing an inverse-transform for the transform coefficient.

A reconstructed signal may be generated by adding the obtained residual signal to the prediction signal output by the inter prediction unit 260 or the intra prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter prediction unit 260.

In this specification, the same embodiments described regarding the transform unit 120 and each function unit of the encoder 100 may be applied to the inverse transform unit 230 and any corresponding function unit of the decoder.

FIG. 3 is a diagram for illustrating a split structure of a coding unit, according to one embodiment of the present invention.

The encoder may split or divide one image or picture into a rectangular coding tree unit (CTU). Thereafter, the encoder may sequentially encode CTUs one by one according to the raster scan order.

For example, the size of a CTU may be set to 64×64, 32×32 or 16×16, but the present invention is not limited thereto. The encoder may select the size of a CTU based on resolution of an input image or the characteristics of an input image. A CTU may include a coding tree block (CTB) for a luma component and a coding tree block (CTB) for corresponding two chroma components.

A single CTU may be decomposed into a quad-tree (hereinafter referred to as a "QT") structure. For example, one CTU may be divided into four units, each unit having a square shape, with a length of each side thereof decreasing by one half. This decomposition or division of the QT structure may be performed recursively.

Referring to FIG. 3, a root node of the QT may be related to the CTU. The QT may be partitioned until a leaf node is reached. In this case, the leaf node may be referred to as a coding unit (CU).

The CU may refer to a base unit for the coding process of an input image, for example, a base unit for intra/inter-predictions. The CU may include a CB for a luma component and a CB for two chroma components corresponding to the luma component. For example, the size of the CU may be set to 64×64, 32×32, 16×16 or 8×8. However, the present invention is not limited thereto. In the case of a high-resolution image, the size of the CU may be increased or varied.

Referring to FIG. 3, the CTU may correspond to the root node, and may have the smallest depth (i.e., level 0). Depending on the characteristics of the input image, the CTU may not be divided. In this case, the CTU corresponds to the CU.

The CTU may be decomposed into a QT form. As a result, sub-nodes, each having a depth of level 1, may be generated. Among the sub-nodes, each having a depth of level 1, a sub-node (i.e., a leaf node) that is not further divided corresponds to a CU. For example, in FIG. 3(*b*), each of the coding units CU(a), CU(b), and CU(j) corresponding to nodes a, b and j, respectively, is split in a CTU once, thus having a depth of level 1.

At least one of sub-nodes; each one having a depth of level 1 may be further split into a QT form. Among the sub-nodes, each having a depth of level 2, a sub-node (i.e., a leaf node) that is not further divided corresponds to a CU. For example, in FIG. 3(*b*), each of the coding units CU(c), CU(h), and CU(i) corresponding to nodes c, h and i respectively are partitioned two times in the CTU and thus has a depth of level 2.

Further, among the sub-nodes, each having a depth of level 2, at least one sub-node may be further split into a QT form. Among the sub-nodes, each having a depth of level 3, a sub-node (i.e., a leaf node) that is not further divided corresponds to a CU. For example, in FIG. 3(*b*), each of the coding units CU(d), CU(e), CU(f) and CU(g) corresponding to nodes d, e, f and g respectively are partitioned three times in the CTU and thus has a depth of level 3.

The encoder may determine a maximum or minimum size of the CU based on the characteristics (e.g., resolution) of the video image or the efficiency of coding. Information on the maximum or minimum size and/or information used for deriving the maximum or minimum size may be included in the bit stream. Hereinafter, a CU having a maximum size may be referred to as a LCU (Largest Coding Unit), while a CU having a minimum size may be referred to as a SCU (Smallest Coding Unit).

In addition, a CU having a tree structure may have a predetermined maximum depth information (or maximum level information) and may be hierarchically divided. Further, each divided CU may have depth information. The depth information indicates the number and/or degree of divisions of the CU. Thus, the depth information may include information about the size of the CU.

The LCU is divided into a QT form. Therefore, the size of the SCU may be obtained using the LCU size and the maximum depth information of the tree. Conversely, the size of the SCU and the maximum depth information of the tree may be used to determine the size of the LCU.

For a single CU, information indicating whether or not the CU is divided may be transmitted to the decoder. For example, the information may be defined as a split flag and may be represented by a syntax element "split_cu_flag." The split flag may be included in all CUs except a SCU. For example, when the value of the split flag is "1", the corresponding CU is further divided into four CUs. When the value of the split flag is "0", the corresponding CU is not further divided, and, then, the coding process for the corresponding CU may be performed.

In the embodiment shown in FIG. 3, although the QT structure described above is applied to the CU division by way of example, the QT structure described above may be equally applied to TU (transform unit) division, where the TU is a base unit for performing transform.

The TU may be hierarchically partitioned from the CU to be coded into a QT structure. For example, the CU may correspond to a root node of the tree for the transform unit TU.

The TU is divided into a QT structure. Thus, each of TUs divided from the CU may be further divided into smaller sub-TUs. For example, the size of the TU may be set to 32×32, 16×16, 8×8 or 4×4. However, the present invention is not limited thereto. For high-resolution images, the size of a TU may be larger or may vary.

For a single TU, information indicating whether or not the TU is divided may be transmitted to the decoder. For example, the information may be defined as a split transform flag and may be represented by a syntax element "split_transform_flag."

The split transform flag may be included in all TUs except the smallest TU (STU). For example, when the value of the split transform flag is "1", the corresponding TU is further divided into four TUs. When the value of the split transform flag is "0", the corresponding TU is not further divided, and, then, the coding process for the corresponding TU may be performed.

As described above, a CU is a base unit for the coding process in which the intra-prediction or inter-prediction is performed. In order to more effectively code the input image, the CU may be divided into PUs (Prediction Units)

A PU is a base unit forming a prediction block. It is possible to generate different prediction blocks on a PU basis even within a single CU. The PU may be differently split depending on whether an intra-prediction mode or an inter-prediction mode is used as a coding mode for a CU to which the PU belongs.

Transform coding is one of the most important tools used for current image and video compression. A transform coefficient is generated by linearly transforming data using a transform. The generated transform coefficient is quantized and entropy-encoded and then transmitted to a decoder. The decoder reconstructs data by performing entropy decoding and dequantization and then inverse-transforming the transform coefficient using an inverse transform. In general, a transform is selected as an orthonormal transform that accepts a simple inverse transform and quantization. In particular, in the case of image and video data, it is very common to use a separable discrete cosine transform (DCT), a discrete sine transform (DST) and other similar transforms.

In the case of data of an N×N block, in general, a separable transform requires computation of $N^3$. If a separable transform used has a fast implementation, a computation count is reduced to $N^2*logN$.

In order to improve compression efficiency, it is important to make a transform coefficient independent statistically by designing the statistics of input data so that the statistics are matched more effectively. For example, compression can be improved using a Karhunen-Loeve transform (KLT) or a sparse orthonormal transform (SOT). However, such a transform corresponds to a non-separable transform having a difficult fast implementation. That is, if such a non-separable transform is to be applied, $N^4$ computation is necessary.

The present invention proposes a method of designing a version having easy computation of a general transform. Specifically, the present invention proposes a method of designing a layered Givens transform (LGT) approximate to a target transform when the target transform is given.

According to the present invention, a transform having the same or similar compression efficiency as or to a given target transform in significantly reduced computational complexity compared to the target transform can be designed.

Hereinafter, the present invention will be described using a square block of N×N pixels. However, the present invention is not limited thereto and may be extended to non-square blocks, data of multiple dimensions and a non-pixel type in addition to the square block. Accordingly, a more adaptive transform can be performed.

In the present invention, a target transform H applicable to an N×N block may be approximated by a layered Givens transform configured with a combination of a rotation layer and a permutation layer. In the present invention, the layered Givens transform may be called a layered transform, but the present invention is not limited to the term.

Definition of Layered Givens Transform (LGT)

Hereinafter, a matrix expression of an N×N image or video block and transform is described. In the description of the present invention, it is assumed that $N^2$ is an even number, for convenience of description.

FIG. 4 is an embodiment to which the present invention is applied and is a diagram illustrating a method of arranging two-dimensional data blocks in the form of a one-dimensional array.

In order to apply a non-separable transform, two-dimensional (or two-dimensional array) data blocks may be arranged in the form of a one-dimensional array. For example, blocks of a 4×4 size may be arranged in row-first lexicographic order, as shown in FIG. 4. Furthermore, the blocks may be arranged in column order within each row. Although not shown in FIG. 4, the blocks may be arranged in column-first order. However, the present invention is not limited thereto. The encoder/decoder may arrange two-dimensional blocks in the form of a one-dimensional array using various methods in addition to the lexicographic order.

In the present invention, a layered Givens transform may be applied to a given N×N transform. In general, a non-separable transform has high compression performance compared to a separable transform, but has a difficult fast implementation and requires high computational complexity. Accordingly, embodiments of the present invention are described based on a case where a target transform is a non-separable transform, but the present invention is not limited thereto. That is, a layered Givens transform may be applied to a separable transform and may be applied to a non-separable transform.

A general non-separable transform H applicable to an N×N block may be represented as an $N^2 \times N^2$ matrix. A method proposed in the present invention may be used to approximate a non-orthogonal transform, but it is assumed that a target transform H satisfies orthonormal, that is, Equation 1 below, for convenience of description.

$$H^T H = I, \qquad \text{[Equation 1]}$$

In this case, HT indicates a transpose matrix of H, and I indicates an identity matrix of $N^2 \times N^2$. Furthermore, an $N^2 \times N^2$ permutation matrix P is an orthonormal matrix and satisfies Equation 2.

$$P^T P = I, \qquad \text{[Equation 2]}$$

Each row of P may include a single element not 0. When a data vector x is given, a vector y satisfying y=P*x may be obtained by shuffling the elements of the vector x.

FIG. 5 is an embodiment to which the present invention is applied and is a diagram illustrating an example in which a permutation matrix is applied.

The encoder/decoder may shuffle data vectors by applying a permutation matrix as shown in FIG. 5. Subsequent computation can be efficiently performed by performing such shuffling. For example, non-zero coefficients may be concentrated on a specific area through shuffling.

The present invention proposes a method of finding a layered Givens transform $G(N^2 \times N^2)$ approximated to H when the target transform H is given. G may be represented like Equation 3.

$$G = G_M G_{M-1} \ldots G_1 P_0 \qquad \text{[Equation 3]}$$

In this case, $G_i(N^2 \times N^2)$ (wherein i=1, 2, M) is a Givens rotation layer (or rotation layer, rotation matrix), and $P_0(N^2 \times N^2)$ is a permutation layer (or permutation matrix). An integer M may have a given value, for example, 1, 2, 5, 10, logN, N. $G_i$ may be represented like Equation 4.

$$G_i = P_i^T \begin{bmatrix} T_{i,1} & 0 & & 0 \\ 0 & T_{i,2} & & \\ \vdots & & \ddots & \\ 0 & & & T_{i,\frac{N^2}{2}} \end{bmatrix} P_i \quad \text{[Equation 4]}$$

In this case, $P_i(N^2 \times N^2)$ is a permutation matrix, and $T_{(i,j)}$ is a pairwise rotation matrix (i.e., Givens rotation matrix). That is, the Givens rotation layer $G_i$ may be configured with a combination of the permutation matrix and the rotation matrix. $T_{(i,j)}$ is described based on the following drawing.

FIG. 6 is an embodiment to which the present invention is applied and is a diagram illustrating an example in which a rotation matrix is applied.

Referring to FIG. 6(*a*), the rotation matrix $T_{(i,j)}$ may be represented like Equation 5.

$$T_{i,j} = \begin{bmatrix} \cos(\theta_{i,j}) & \sin(\theta_{i,j}) \\ -\sin(\theta_{i,j}) & \cos(\theta_{i,j}) \end{bmatrix} \quad \text{[Equation 5]}$$

Referring to FIG. 6(*b*), in an embodiment of the present invention, $T_{(i,j)}$, such as Equation 6, may be taken into consideration in order to permit reflection along with rotation (i.e., rotation plus reflection). That is, in an embodiment of the present invention, $T_{(i,j)}$ may form pairwise rotation and rotation plus reflection.

$$T_{i,j} = \begin{bmatrix} \sin(\theta_{i,j}) & \cos(\theta_{i,j}) \\ \cos(\theta_{i,j}) & -\sin(\theta_{i,j}) \end{bmatrix} \quad \text{[Equation 6]}$$

FIG. 7 is a diagram illustrating an example of a transform to which the present invention is applied.

In an embodiment of the present invention, as shown in FIG. 7(*a*), $T_{(i,j)}$ may be configured as a general two-dimensional non-linear transform that receives two inputs and outputs two outputs.

Furthermore, in an embodiment of the present invention, as shown in FIG. 7(*b*), $T_{(i,j)}$ may be configured as a linear transform or non-linear transform having two or more dimensions.

Furthermore, as shown in FIG. 7, the LGT of the present invention may include a linear transform or non-linear transform of a two-dimensional or multi-dimension.

If Equation 5 or Equation 6 is used, the rotation matrix $T_i$ may be represented like Equation 7.

$$T_i = \begin{bmatrix} T_{i,1} & 0 & & 0 \\ 0 & T_{i,2} & & \\ & & \ddots & \\ \vdots & & & \\ 0 & & & T_{i,\frac{N^2}{2}} \end{bmatrix} \quad \text{[Equation 7]}$$

A forward general transform (i.e., target transform H) may obtain a transform coefficient $c_{general}$ using Equation 8 with respect to the data vector x.

$$c_{general} = H^T x \quad \text{[Equation 8]}$$

Meanwhile, the LGT may obtain an LGT transform coefficient $c_{LGT}$ using Equation 9.

$$c_{LGT} = G^T x = P_0^T G_1^T \ldots G_M^T x \quad \text{[Equation 9]}$$

An inverse transform of the transform coefficient generated by Equation 8 and Equation 9 may be performed by Equation 10.

$$x = H c_{general}$$

$$x = G c_{LGT} = G_M \ldots G_1 P_0 c_{LGT} \quad \text{[Equation 10]}$$

FIG. 8 is an embodiment to which the present invention is applied and is a diagram illustrating a method of applying forward and backward layered Givens transforms.

Referring to FIG. 8(*a*), the encoder may obtain an LGT transform coefficient by applying a forward LGT transform. Specifically, the encoder may obtain an LGT transform coefficient by sequentially applying a rotation layer and a permutation layer to input data x, as shown in FIG. 8(*a*).

Referring to FIG. 8(*b*), the encoder/decoder may reconstruct x by applying a backward LGT transform to the LGT transform coefficient. Specifically, the decoder may reconstruct (or obtain) x by sequentially applying a permutation layer and a rotation layer to the LGT transform coefficient, as shown in FIG. 8(*b*).

FIG. 9 is an embodiment to which the present invention is applied and is a diagram illustrating a method of applying a rotation layer.

Referring to FIG. 9, a Givens rotation layer $G_i$ may be configured with a combination of a permutation matrix and a rotation matrix. The encoder/decoder may apply the permutation matrix in order to efficiently apply pairwise rotation. The encoder/decoder may apply the rotation matrix to shuffled data and then reversely shuffle the shuffled data.

In an embodiment of the present invention, a target transform H may be a KLT, a sparse orthonormal transform (SOT), a curvelet transform, a contourlet transform or a complex wavelet transform.

Design of Layered Givens Transform (LGT)

When a target transform H is given, a layered Givens transform G may be designed using Equation 11.

$$\min_G \|H - G\|_F \quad \text{[Equation 11]}$$

In this case, $\|.\|_F$ indicates Frobenius norm. Equation 11 is an optimization problem of G matched with the target transform H. Assuming that $Tr\{A\}$ is a trace of a matrix A, Equation 11 may be represented like Equation 12. In this case, the trace indicates the sum of diagonal components of the matrix.

$$\|H-G\|_F^2 = Tr\{H^T H\} - 2Tr\{H^T G\} + Tr\{G^T G\} \quad \text{[Equation 12]}$$

As in the above assumption, Equation 12 may be arranged like Equation 13 because H and G are orthonormal.

$$\|H-G\|_F^2 = 2N^2 - 2Tr\{H^T G\} \quad \text{[Equation 13]}$$

General minimization can be obtained by accommodating a weight vector w having a positive element. In this case, the weight vector indicates the importance of each basis vector (i.e., each column of H) within H. In this case, the importance may be determined based on the frequency of each component. Accordingly, when the weight vector W is taken into consideration, the minimization problem of Equation 11 may be represented like Equation 14.

$$\min_G \|(H-G)W\|_F \qquad \text{[Equation 14]}$$

In this case, the weight matrix $W(N^2 \times N^2)$ may be represented like Equation 15.

$$W(k,l) = \begin{cases} w^{1/2}(k), & k=l \\ 0, & k \neq l \end{cases} \qquad \text{[Equation 15]}$$

The optimization problem of Equation 11 or Equation 14 comes down to the optimization problem of layers configuring a layered Givens transform. Hereinafter, a method of determining (or deriving) a permutation layer $P_0$ is described.

Equation 14 may be arranged like Equation 16 using trace attributes.

$$\|(H-G)W\|_F^2 = 2Tr\{W^TW\} - \qquad \text{[Equation 16]}$$
$$2Tr\{W^TH^TG_M G_{M-1} \ldots G_1 P_0 W\}$$
$$= 2Tr\{W^TW\} -$$
$$2Tr\{WW^TH^TG_M G_{M-1} \ldots G_1 P_0\}$$

In this case, it is assumed that other variables other than $P_0$ have been fixed. A minimization problem of Equation 16 is a maximization problem of $2Tr\{WW^TH^TG_M G_{M-1} \ldots G_1 P_0\}$. In this case, $P_0$ may be determined using a Hungarian algorithm. This is described based on the following drawing.

FIG. 10 is an embodiment to which the present invention is applied and is a diagram illustrating a method of determining a permutation layer using a Hungarian algorithm.

Referring to FIG. 10, the encoder/decoder may determine optimal assignment not overlapped between nodes using the Hungarian algorithm. Specifically, in Equation 16, $2Tr\{WW^TH^TG_M G_{M-1} \ldots G_1 P_0\}$ indicates the sum of diagonal matrices of $WW^TH^TG_M G_{M-1} \ldots G_1 P_0$. The encoder/decoder may calculate optimal assignment that maximizes the $WW^TH^TG_M G_{M-1} \ldots G_1 P_0$ through a Hungarian method.

In an embodiment of the present invention, a blossom method may be used to design a permutation matrix.

Hereinafter, a method of determining a Givens rotation layer $G_i$ is described.

As described in Equation 3, the layered Givens transform G may be configured with a combination of a Givens rotation layer and a permutation layer. In this case, G may include one or more Givens rotation layers. In order to optimize, the i-th Givens rotation layer $G_i$ of a plurality of given layers, Equation 14 may be arranged like Equation 17.

$$\text{[Equation 17]}$$
$$\|(H-G)W\|_F^2 = \|HW - G_M G_{M-1} \ldots G_i \ldots G_1 P_0 W\|_F^2$$
$$= \|G_{i+1}^T \ldots G_M^T HW - G_i G_{i-1} \ldots G_1 P_0 W\|_F^2$$
$$= \|\hat{H}_i - G_i R_i\|_F^2$$
$$= Tr\{\hat{H}_i^T \hat{H}_i\} - 2Tr\{\hat{H}_i^T G_i R_i\} + Tr\{R_i^T R_i\}$$

In this case, $\hat{H}_i = G_{i+1}^T \ldots G_M^T HW$, and $R_i = G_{i-1} \ldots G_1 P_0 W$. $G_i$ selects a pair of rows in $R_i$, and rotates the selected pair in order to match the selected pair with a pair of co-located rows within $\hat{H}_i$. An optimal $G_i$ may be determined by selecting the best pair and the best rotation angle that minimize Equation 17. First, the encoder/decoder may calculate the best rotation angle of each pair by configuring a pair gain, and may determine pairs that maximize the sum of pair gains. A method of determining a rotation angle through the configuration of a pair gain is first described.

It is assumed that $G_i$ has selected rows p and q as a j-th pair to be rotated by $T_{(i,j)}$. Furthermore, $r_{(i,p)}$ and $r_{(i,q)}$ determine the rows p and q of $R_i$, and $h_{(i,p)}$ and $h_{(i,q)}$ determine the rows p and q of $\hat{H}_i$. Equation 17 may be represented like Equation 18 based on the rows.

$$\text{[Equation 18]}$$
$$\left\| \begin{bmatrix} h_{i,p} \\ h_{i,q} \end{bmatrix} - \begin{bmatrix} \cos(\theta_{i,j}) & \sin(\theta_{i,j}) \\ -\sin(\theta_{i,j}) & \cos(\theta_{i,j}) \end{bmatrix} \begin{bmatrix} r_{i,p} \\ r_{i,q} \end{bmatrix} \right\|_F^2 = \|h_{i,p}\|^2 + \|h_{i,q}\|^2 + \|r_{i,p}\|^2 +$$
$$\|r_{i,q}\|^2 - 2\cos(\theta_{i,j})(h_{i,p} r_{i,p}^T + h_{i,q} r_{i,q}^T) - 2\sin(\theta_{i,j})(h_{i,p} r_{i,q}^T - h_{i,q} r_{i,p}^T)$$

An optimal rotation angle $\theta_{(i,j)}$ may be determined as a value that minimize Equation 18. Some equations of Equation 18 may be defined as $c_{(i,p,q)}$ and $s_{(i,p,q)}$ as in Equation 19.

$$c_{i,p,q} = h_{i,p} r_{i,p}^T + h_{i,q} r_{i,q}^T$$
$$s_{i,p,q} = h_{i,p} r_{i,q}^T - h_{i,q} r_{i,p}^T \qquad \text{[Equation 19]}$$

When $G_i$ selects the rows p and q, the optimal rotation angle $\theta_{(i,j)}$ satisfies Equation 20.

$$\cos(\theta_{i,j}) = c_{i,p,q}/(c_{i,p,q}^2 + s_{i,p,q}^2)^{1/2}, \sin_{i,p,q}/(c_{i,p,q}^2 + s_{i,p,q}^2)^{1/2} \qquad \text{[Equation 20]}$$

Equation 18 may be arranged like Equation 21 using Equations 19 and 20.

$$\|h_{i,p}\|^2 + \|h_{i,q}\|^2 + \|r_{i,p}\|^2 + \|r_{i,q}\|^2 - 2(c_{i,p,q}^2 + s_{i,p,q}^2)^{1/2} \qquad \text{[Equation 21]}$$

That is, when a case where the rows p and q are selected as a pair and rotated in order to obtain an optimal $G_i$ is taken into consideration, an optimization gain is the same as $2(c_{i,p,q}^2 + s_{i,p,q}^2)^{1/2}$ compared to a case where Givens rotation is not performed. Accordingly, the pair gain of the Givens rotation may be defined like Equation 22.

$$\text{gain}(i,p,q) = (c\_(i,p,q)^2 + s\_(i,p,q)^2)^{(1/2)} \qquad \text{[Equation 22]}$$

A pair gain for the case of rotation plus reflection may be obtained by interchanging $r_{(i,p)}$ and $r_{(i,q)}$ in Equation 18 or 19. In this case, the final pair gain gain(i,p,q) may be determined (or set) as a gain having a maximum value among two pair gains calculated in the case of rotation and the case of rotation plus reflection.

In an embodiment of the present invention, the pair gain gain(i,p,q) may be modified by taking into consideration computational complexity and memory complexity. For example, the pair gain may be calculated using $2(c_{i,p,q}^2 + s_{i,p,q}^2)$ instead of $2(c_{i,p,q}^2 + s_{i,p,q}^2)^{1/2}$ of Equation 22.

In an embodiment of the present invention, the pair gain gain(i,p,q) may be calculated by taking into consideration only a limited set of $\theta_{(i,j)}$. For example, the encoder/decoder may take into consideration $\theta_{(i,j)}$ that satisfies $\theta_{i,j} \in \{\varphi_1, \varphi_2, \varphi_k\}$ instead of all $\theta_{(i,j)}$ satisfying $0 \leq \theta_{i,j} < 2\pi$. In this case, $\varphi_k$ may be different angles that satisfy $0 \leq \varphi_k < 2\pi$. $\theta_{(i,j)}$ that minimizes Equation 18 may be determined based on the $\theta_{(i,j)}$. For example, $\varphi_k$ may be $k*(2\pi/m)$. In this case, m may be the number of all angles.

In an embodiment of the present invention, the pair gain gain(i,p,q) may be calculated by permitting a specific pair (or limited pair) p and q. For example, the pair gain may be modified like Equation 23 in order to limit memory access, a cache miss, etc.

$$\text{gain}(i, p, q) = \begin{cases} \text{gain}(i, p, q) & |p - q| \leq \Delta \\ -\infty & \text{otherwise} \end{cases} \quad \text{[Equation 23]}$$

In this case, $\Delta$ is a given value, and may have a value, for example, 1, 10, 17, 123, 1024, 2048. Furthermore, for example, the pair gain may be calculated using Equation 24.

$$\text{gain}(i, p, q) = \begin{cases} \text{gain}(i, p, q) & f(p, q) \leq \Delta \\ -\infty & \text{otherwise} \end{cases} \quad \text{[Equation 24]}$$

In this case, f(p,q) may correspond to a general function.

Next, the encoder/decoder may derive an optimal Givens rotation layer $G_i$ by determining total pairs that maximize the sum of pair gains.

The optimization of $G_i$ may be achieved by maximizing the sum of pair gains with respect to all non-intersecting pairs. This may come down to a problem of maximum matching in the graph theory.

In this case, it is assumed that the indices of $N^2$ rows are determined as the vertexes of the graph. Furthermore, it is assumed that the pair gain gain(i,p,q)=gain(i,e) of Equation 22 is the weight of an edge e(e={p,q}) within the entire edge set E within the graph.

The encoder/decoder may determine an edge set $\Omega$ satisfying a condition in which each vertex corresponds to one edge in E, that is, a vertex does not overlap in several edges, and may determine $\Omega$ in which the sum of edge weights within the $\Omega$ becomes a maximum. This may be represented like Equation 25.

$$\max_{\Omega \subseteq E} \sum_{e_k \in \Omega} \text{gain}(i, e_k) \quad \text{[Equation 25]}$$

$$\text{such that } e_k \cap e_l = \emptyset, \forall e_k, e_l \in \Omega, k \neq l$$

In this case, $e_k$ and $e_l$ indicate edges within the entire edge set E. Referring to Equation 25, edges may be determined so that a total sum of pair gains of edges becomes a maximum within the edge $\Omega$ in which each vertex corresponds to one edge. Such a maximum matching problem can be solved using a blossom algorithm. This is described based on the following drawing.

FIG. 11 is an embodiment to which the present invention is applied and is a diagram illustrating a method of determining a rotation layer using a blossom algorithm.

Referring to FIG. 11, the encoder/decoder may find a maximum matching pair of non-overlapped edges using the blossom algorithm. In other words, the encoder/decoder may determine edges having a total maximum pair gain (or weight) of non-overlapped edges using the blossom algorithm.

The encoder/decoder may determine an optimal $N^2/2$ number of pairs using the above-described method and calculate $T_{(i,j)}$ based on an optimal rotation (or rotation plus reflection) angle of each pair. Accordingly, an optimal $G_i$ can be derived.

Design Algorithm of Layered Givens Transform (LGT)

As a solution to the LGT design problem of Equation 14, the present invention proposes an algorithm for designing a layered Givens transform approximate to a target transform.

FIG. 12 is an embodiment to which the present invention is applied and is a conceptual view for illustrating a method of optimizing a layered Givens transform.

Referring to FIG. 12, the optimizer of a layered Givens transform outputs an optimized LGT using a target transform H (or desired transform H) and related parameters as input. The optimizer may be implemented as an element including the encoder and the decoder.

The algorithm for designing a layered Givens transform may include the following six algorithms (or procedures).

The first is the optimization algorithm of a permutation layer $P_0$.

TABLE 1

1. Use Hungarian method to minimize (equation 16) in terms of $P_0$.

Table 1 shows an example of the optimization algorithm of $P_0$. This is described specifically.

1. Determine $P_0$ that minimizes Equation 16 using the Hungarian method

The second is the optimization algorithm of a Givens rotation layer $G_i$.

TABLE 2

1. Calculate pair gains gain(i,p,q) for all possible pairings.
2. Use Blossom method to maximize (equation 25) in terms of matchings.
3. Use the optimal pairs to construct $P_i$, optimal $T_{i,j}$, and $G_i$.

Table 2 shows an example of the optimization algorithm of $G_i$. This is described specifically.

1. Calculate the pair gains(i,p,q) of all possible pairs.
2. Determine non-overlapped optimal pairs that maximize Equation 25 using the blossom method.
3. Configure $P_i$, optimal $T_{(i,j)}$ and $G_i$ using optimal pairs.

The third is a Descent algorithm. In the Descent algorithm, the above-described optimization algorithm of $P_0$ is called, and an optimal layer matched with a target transform H is derived while changing a Givens rotation layer. The Descent algorithm may have initial LGT $G^0$ as input. Alternatively, it is assumed that the initial LGT $G^0$ has been given.

TABLE 3

1. Set m = 0, err(0) = $\|(H - G^0)W\|_F^2$
2. Repeat
   m = m + 1
   Optimize $P_0$
   Update $P_0$ in $G^{m-1}$ to construct candidate $G_c^{m,0}$
   calculate updated error $\text{err}_0(m) = \|(H - G_c^{m,0})W\|_F^2$
                   for k = 1:M
   Optimize $G_k$
   Update $G_k$ in $G^{m-1}$ to construct candidate $G_c^{m,k}$
   Calculate updated error $\text{err}_k(m) = \|(H - G_c^{m,k})W\|_F^2$
   end for
                 $k' = \min_k\{\text{err}_k(m)\}$
                 $G^m = G_c^{m,k'}$
                 $\text{err}(m) = \text{err}_{k'}(m)$.
   Until $\text{err}(m - 1) - \text{err}(m) < \epsilon$
3. Output $G = G^m$ Table 3 shows an example of the Descent algorithm. This is described specifically.

1. As in Equation 26, an initial value is set.

$$m=0, \text{err}(0)=\|(H-G^0)W\|_F^2 \quad [\text{Equation 26}]$$

In this case, m indicates the number of times that iteration is performed in order to find an optimal value as a variable for counting. Furthermore, an err( ) function indicates a matching error for a target transform. The approximation of the target transform may become higher as the err( ) value becomes smaller.

2. The following steps are repeated until Equation 27 is satisfied.

$$\text{err}(m-1)-\text{err}(m)<\epsilon \quad [\text{Equation 27}]$$

In this case, $\epsilon$ is a sufficiently small value and indicates a threshold. As $\epsilon$ increases, an optimal value may be found based on a less iteration number (i.e., fast converge). As $\epsilon$ decreases, an approximation degree of the target transform may become higher.

(1) m is increased by 1. That is, m is set as an m+1 value.

(2) $P_0$ is optimized. In this case, the optimization algorithm of the above-described $P_0$ may be performed.

(3) An LGT candidate $G_c^{m,0}$ is constructed by updating $P_0$ within $G_{m-1}$ with the optimized $P_0$. That is, $G_c^{m,0}$ having the updated $P_0$ is used in $G^{m-1}$. In this case, $G^{m-1}$ is not changed.

(4) An error $\text{err}_0(m)$ for $G_c^{m,0}$ is calculated using Equation 28.

$$\text{err}_0(m)=\|(H-G_c^{m,0})W\|_F^2 \quad [\text{Equation 28}]$$

(5) The following steps a), b), c) are repeated until k becomes m from 1.

a) $G_k$ is optimized. In this case, the above-described optimization algorithm of $G_i$ may be performed.

b) A candidate $G_c^{m,k}$ is constructed by updating $G_k$ with $G^{m-1}$ with the optimized $G_k$. That is, $G_c^{m,k}$ having the updated $G_k$ is used in $G^{m-1}$. In this case, $G^{m-1}$ is not changed.

c) An error $\text{err}_k(m)$ for the $G_c^{m,k}$ is calculated using Equation 29.

$$\text{err}_k(m)=\|(H-G_c^{m,k})W\|_F^2 \quad [\text{Equation 29}]$$

(6) k' is set as k that minimizes an error value using Equation 30.

$$k'=\min_k\{\text{err}_k(m)\} \quad [\text{Equation 30}]$$

(7) $G^m$ is set as $G_c^{m,k'}$.

(8) An error err(m) is set as $\text{err}_{k'}(m)$.

3. A layered Givens transform G is set as $G^m$.

The fourth is a random neighbor search algorithm. In the random neighbor search algorithm, in order to determine an optimal value more effectively, some layers are set as a random value and the above-described Descent algorithm is called. The random neighbor search algorithm may have G as its input. Alternatively, it is assumed that G has been given.

TABLE 4

1. Randomly select M/2+1 layers in G
2. Set the selected layers in G to identity matrix to construct $G'_{init}$
3. G' = descent algorithm($G'_{init}$)
4. Return G'

Table 4 shows an example of the random neighbor search algorithm. This is described specifically.

1. M/2+1 layers are randomly selected from G. However, the number of selected layers is one example, and the present invention is not limited thereto.

2. $G_{init'}$ is constructed by configuring the selected layers as an identity matrix.

3. G' is set as the output of the Descent algorithm having $G_{init'}$ as input.

4. G' is returned.

The fifth is a simulated annealing algorithm. In the simulated annealing algorithm, the random neighbor search algorithm is called. An optimal value is found while repeatedly comparing a derived solution (i.e., new optimal value) with the existing solution by applying the random neighbor search algorithm. The simulated annealing algorithm may have initial LGT $G^0$ as its input. Alternatively, it is assumed that the initial LGT $G^0$ has been given.

TABLE 5

1. Set m = 0, err(0) = $\|(H - G^0)W\|_F^2$
2. G(cur) = $G^0$, err(cur) = err(0)
3. Repeat
   m = m+1
              $G^m$ = find random neighbor(G(cur))
   Calculate err(m) = $\|(H - G^m)W\|_F^2$
        accept = decide acceptance(err(m),err(cur),m)
              if (accept)
   G(cur) = $G^m$, err(cur) = err(m)
   end if
   Until m > maximum number of iterations
4. Output G = G(cur)

Table 5 shows an example of the simulated annealing algorithm. This is described specifically.

1. As in Equation 31, an initial value is set.

$$m=0, \text{err}(0)=\|(H-G^0)W\|_F^2 \quad [\text{Equation 31}]$$

2. A current layered Givens transform G(cur) is set as $G^0$, and a current error err(cur) is set as err(0).

3. The following steps a), b), c), d), e) are repeated until m is greater than or equal to a maximum number of iterations.

a) m is increased by 1. That is, m is set as an m+1 value.

b) $G^m$ is set as the output of the random neighbor search algorithm having G(cur) as its input.

C) An error err(m) for $G^m$ is calculated using Equation 32.

$$\text{err}(m)=\|(H-G^m)W\|_F^2 \quad [\text{Equation 32}]$$

d) A variable accept indicating acceptance is set as the output of an acceptance determination algorithm having err(m), err(cur) and m as its input. The acceptance determination algorithm is described later.

e) When an accept value is 1, G(cur) is set as $G^m$, and err(cur) is set as err(m).

4. G(cur) is output.

The sixth is an acceptance determination algorithm. In the acceptance determination algorithm, whether a newly obtained solution (i.e., optimal value) will be selected is determined based on the probability. The acceptance determination algorithm may have err(m), err(cur), an iteration number m as its input. Alternatively, it is assumed that err(m), err(cur), an iteration number m have been given.

TABLE 6

1.     Calculate current temperature t by m, e.g., $$t = \log\left(\frac{\text{MAX\_ITER\_COUNT}}{m}\right)$$

TABLE 6-continued

2. Determine acceptance probability p by err(m), err(cur) and t, e.g., p = exp((err(cur) − err(m))/t)
3. Generate Bernoulli random variable A~Ber(p)
4. If A = 1, return accept; else, return reject.

Table 6 shows an example of the acceptance determination algorithm. This is described specifically.

1. A current temperature t is calculated based on m. For example, t may be calculated using Equation 33.

$$t = \log\left(\frac{\text{MAX\_ITER\_COUNT}}{m}\right) \quad \text{[Equation 33]}$$

In this case, MAX_ITER_COUNT indicates a maximum number of iterations. As the iteration number increases, a t value may be reduced.

2. The acceptance probability p is determined based on err(m), err(cur) and t.

For example, p may be calculated using Equation 34.

$$p = \exp((\text{err}(cur) - \text{err}(m))/t) \quad \text{[Equation 34]}$$

Referring to Equation 34, although a difference between error values according to an optimal value newly obtained through the random neighbor search algorithm is the same, it may not be accepted when the t value is low.

3. A Bernoulli random variable A is generated based on the determined acceptance probability p.

4. accept is returned when A is 1, and reject is returned if not. Alternatively, an A value is set as the accept value.

FIGS. 13 and 14 are embodiments to which the present invention is applied and are flowcharts for illustrating an algorithm for designing a layered Givens transform.

The above-described Descent algorithm may be performed according to steps, such as those shown in FIG. 13.

The encoder/decoder performs initialization (S1301).

A variable m indicating the number of iterations and an err( ) function indicating the matching error of a target transform are initialized using Equation 26. The err( ) function may be initialized using a given initial LGT.

The encoder/decoder performs optimization on each of layers configuring the LGT (S1302).

As described above, the encoder/decoder may derive an optimal layer matched with a target transform H⁰∥ while changing the layers one by one.

The encoder/decoder updates the LGT using an optimal layer selected in step S1302 (S1303).

The encoder/decoder determines whether an error value converges based on the updated LGT (S1304).

If, as a result of the determination in step S1304, the error value does not converge, an iteration is performed until the error value converges by performing step S1302 again (S1305).

If, as a result of the determination in step S1305, the error value converges, the determined optimal LGT is determined as the local optimum.

An optimized LGT may be obtained by the above-described Descent algorithm. However, the optimized LGT may have a limit that it converges without reaching the global optimum having a higher approximation for a target transform than the local optimum because several layers are not optimized at once and can be optimized and updated one by one. Such a limit can be overcome by performing the simulated annealing algorithm. The above-described simulated annealing algorithm may be performed according to steps, such as those shown in FIG. 14.

The encoder/decoder performs initialization (S1401). The initialization may be performed identically with step S1301 of FIG. 13.

The encoder/decoder searches for a neighbor of a current LGT (S1402). In this case, the above-described random neighbor search algorithm may be performed.

The encoder/decoder searches for a local optimum based on the retrieved neighbor (S1403). That is, the encoder/decoder newly determines the local optimum based on layers initialized through the random neighbor search algorithm. In this case, the Descent algorithm described in FIG. 12 may be performed The encoder/decoder calculates a jump probability p (S1404), and determines whether to set the current local optimum as the local optimum retrieved in step S1403 based on a jump probability p value (S1405). In this case, the jump may mean newly obtained local optimum adoption, and the jump probability p may be determined based on the current number of iterations and a maximum number of iterations. In this case, the above-described acceptance determination algorithm may be performed.

If, as a result of the determination in step S1405, jump (or acceptance) is determined, the encoder/decoder sets a current LGT as the local optimum retrieved in step S1403 (S1406).

The encoder/decoder sequentially performs the steps from step S1402 to step S1406 repeatedly until a maximum number of iterations is reached (S1407).

When the current number of iterations reaches the maximum number of iterations, the encoder/decoder determines the current LGT as an optimal LGT (S1408).

Covariance Extension

In the case of the Gaussian process, the KLT corresponds to an optimal transform. It is assumed that the Gaussian process has a covariance matrix K satisfying Equation 35.

$$K = H \Lambda H^T \quad \text{[Equation 35]}$$

In this case, H is the KLT, and Λ is the diagonal matrix of an Eigen value. If Equation 35 is used, Equation 11 may be arranged like Equation 36.

$$\min_{G} \|K - G \Lambda G^T\|_F \quad \text{[Equation 36]}$$

The minimization may be performed by repeatedly obtaining $G^m$ using Equation 36, for example, Equation 37.

$$G^m = \operatorname*{argmin}_{G} \|K - G^{m-1} \Lambda G^T\|_F \quad \text{[Equation 37]}$$

Equation 37 can be solved using the above-described methods described in the LGT design and LGT design algorithm. Furthermore, another minimization scheme (or optimization scheme) using the covariance matrix K may be used.

Training Data Extension

A sparse transform may be obtained using a training set of vectors arranged in the columns of a matrix X. In such a case, an LGT may be obtained using Equation 38.

$$\min_{G} \left\{ \min_{C} \|X - GC\|_F^2 + \lambda \|C\|_0 \right\} \quad \text{[Equation 38]}$$

In this case, x indicates input data, C indicates an LGT coefficient obtained with respect to the columns of X, and $\|\cdot\|_0$ indicates L0 norm. Furthermore, $\lambda$ is a value determined based on a quantization parameter. The input data may be a non-orthogonal matrix. Accordingly, the non-orthogonal matrix may be used to obtain the LGT. The minimization of Equation 38 may be performed by repeatedly obtaining C and $G^m$ using Equation 39, for example.

$$C = \text{hard\_threshold}\left((G^{m-1})^T X, \sqrt{\lambda}\right) \quad \text{[Equation 39]}$$

$$G^m = \underset{G}{\text{argmin}} \|X - GC\|_F$$

In this case, hard_threshold( ) is a function that takes a value of 0 when it is smaller than a specific threshold. That is, when the size of an absolute value of the coefficient is smaller than $\sqrt{\lambda}$, the function may be set as a value of 0. $G^m$ may be obtained using the methods described in the LGT design and LGT design algorithm. Furthermore, different minimization regarding X may be used.

FIG. 15 is an embodiment to which the present invention is applied and shows approximations by an LGT transform, a row-column transform and a separable transform.

Referring to FIG. 15, it is assumed that a target transform is a non-separable transform basis.

When compared with approximations using a row-column transform and separable transform, the LGT preserves high fidelity for a target transform basis compared to other transforms. That is, the LGT can obtain much higher approximation for a target transform than approximations using a row-column transform and separable transform.

Additional Embodiments

In an embodiment of the present invention, one or more LGTs may be used to transform $N^2$ data signal values. For example, in the case of the decoder side, the decoder may select a specific LGT using information (i.e., an index indicating the specific LGT), received from the encoder, among several derived LGTs. Alternatively, the encoder/decoder may sequentially apply a plurality of LGTs. For example, the encoder/decoder may perform a transform using the LGT of a first stage, and then may additionally perform a transform using the LGT of a second stage.

In an embodiment of the present invention, a reduced dimensional LGT may be used to transform $N^2$ data signal values as follows. A normal LGT (i.e., the above-described LGT) may be the same as that all $N^2$ elements of X is transformed using an LGT G. That is, the normal LGT may be said to have an $N^2$ dimension. In contrast, the encoder/decoder may perform a transform using reduced dimensional LGT.

It is assumed that $N^2 \times 1$ vectors obtained from N×N data blocks are x. In this case, for example, x may be vectors arranged in lexicographic order from the N×N data blocks.

A permutation matrix $Q_1(N^2 \times N^2)$ may be applied to X. A reduced dimensional LGT of an $N_1(N_1 \leq N^2)$ dimension may be applied to the first $N_1$ element of $Q_{1x}$ (i.e., x to which $Q_1$ has been applied). Furthermore, the remaining elements of $Q_{1x}$ may be delivered to form a transform coefficient vector $y(N^2 \times 1)$, and another reduced dimensional LGT may be applied thereto.

For example, if another reduced dimensional LGT is applied to the remaining elements of $Q_{1x}$, the encoder/decoder may apply the LGT of an $N^2-N_1$ dimension to the remaining elements of $Q_{1x}$.

For example, if another reduced dimensional LGT is applied to the remaining elements of $Q_{1x}$, the encoder/decoder may apply another reduced dimensional LGT to an $N_2$ element among the $N^2-N_1$ elements, and may skip a transform for the remaining $N^2-N_1-N_2$ elements or may recursively apply other $N_3$ reduced dimensional LGTs.

Furthermore, y may be additionally transformed using a method similar to that described above using $Q_2(N^2 \times N^2)$ and $N_2$.

Furthermore, an additional transform may be repeated by a specific number using $Q_l(N^2 \times N^2)$, $N_l(N_l \leq N^2)$ and $l(l=1, \ldots, L)$. The L may be a given positive integer, such as 1, 2, 7, 117, .... In this case, l indicates the number of times that a transform is repeatedly applied. In a process in which iterations are performed, the same value may be used as $Q_l(N^2 \times N^2)$ and $N_l(N_l \leq N^2)$ and a different value may be used every iteration.

FIG. 16 is an embodiment to which the present invention is applied and is a diagram illustrating an example of a method of applying a reduced dimensional LGT.

Referring to FIG. 16, a reduced dimensional LGT may be applied in a subgroup unit within the range in which data to which a permutation matrix has been applied does not overlap.

In an embodiment of the present invention, the final permutation matrix $Q_{final}(N^2 \times N^2)$ may be applied to coefficients generated by a reduced dimensional LGT.

In an embodiment of the present invention, an LGT may be used to transform a pixel value.

In an embodiment of the present invention, an LGT may be used to additionally transform (i.e., secondary transform) the transform coefficient of a different transform. In this case, the different transform may be a DCT, DST, KLT, SOT, wavelet transform, etc.

In an embodiment of the present invention, the number M of LGT layers may be determined based on computational complexity in the encoder and may be transmitted to the decoder.

In an embodiment of the present invention, the number M of LGT layers may be determined in the encoder based on rate-distortion optimization and may be transmitted to the decoder.

In an embodiment of the present invention, rotation or rotation plus reflection, T(i,j) and the inverses thereof may be performed using parallel processing.

In an embodiment of the present invention, the encoder may select an LGT or a different transform (e.g., DCT) based on complexity and/or a rate-distortion viewpoint with respect to a data block, may transform the selected transform, and may signal the selected transform and/or related parameter information to the decoder.

In an embodiment of the present invention, both the encoder and the decoder may determine an LGT using previously decoded data. In this case, the encoder and the decoder may determine the LGT using a covariance or sparse modeling for the data. Furthermore, the encoder may transform and encode an LGT coefficient. The decoder may decode the transform coefficient and apply an inverse LGT. In this case, signaling on information related to the LGT selection may not be performed.

In an embodiment having an object of scalable compression applications, the encoder may apply Mi LGT layers to a data block, may quantize the layers, and may transmit an LGT result coefficient to a baseline decoder as a baseline coefficient. Furthermore, the encoder may further apply LGT layers to the data block, may calculate residual LGT coefficient information regarding the quantized baseline coefficient, and may transmit the residual information as an enhancement layer. An enhancement layer decoder may calculate an additional LGT layer starting as a decoded base line LGT coefficient, may perform an inverse transform by applying all LGT layers to the residual information, and may reconstruct data.

FIG. 17 is a diagram illustrating a schematic block diagram of a transform unit and quantization unit within an encoder to which the present invention is applied.

The encoder may select an LGT or a different transform (e.g., DCT) based on computational complexity or rate-distortion optimization, may transform the selected transform, and may signal the selected transform and/or related parameter information to the decoder.

Specifically, in FIG. 1, the transform unit 120 and the quantization unit 130 may be configured to include a DCT transform unit 1721, an LGT transform unit 1722, a first quantization unit 1731, a second quantization unit 1732 and an RDO determination unit 1735.

The DCT transform unit 1721 and/or the LGT transform unit 1722 may transmit a transform coefficient, transformed from a residual signal, to the first quantization unit 1731 and/or the second quantization unit 1732. Furthermore, the RDO determination unit 1735 may select a DCT transform or LGT transform based on RDO, and may transmit, to the entropy encoding unit 190, the dequantization unit 140 or the inverse transform unit 150, information related to the determined transform or parameter information related to the LGT transform.

FIG. 18 is a diagram illustrating a schematic block diagram of an inverse transform unit and dequantization unit within a decoder to which the present invention is applied.

The decoder may receive transform type information, parameter information related to a transform and/or a transform coefficient. The decoder may select an inverse transform based on the received transform type and may perform dequantization. Furthermore, the decoder may perform an inverse transform on the transform coefficient.

Specifically, in FIG. 2, the dequantization unit 220, the inverse transform unit 230 may be configured to include a first dequantization unit 1821, a second dequantization unit 1822, a DCT inverse transform unit 1831 and an LGT inverse transform unit 1832. The decoder may receive, from the encoder, information related to selected transform. When a DCT transform is selected, dequantization and an inverse transform may be performed by the first dequantization unit 1821 and the DCT inverse transform unit 1831. When an LGT transform is selected, dequantization and an inverse transform may be performed by the second dequantization unit 1822 and the LGT inverse transform unit 1832.

FIG. 19 is an embodiment to which the present invention is applied and is a flowchart for illustrating a process of performing encoding using a layered Givens transform.

The encoder derives at least one rotation layer and permutation layer based on a given transform matrix H and an error parameter (S1901). As described above, the permutation layer may include a permutation matrix obtained by substituting a row of an identity matrix. The permutation matrix may be obtained by performing a process of selecting two rows starting from an identity matrix and exchanging the rows once or multiple times.

Furthermore, the rotation layer may include a permutation matrix and a rotation matrix. The rotation matrix may include at least one pairwise rotation matrix As described above, the pairwise rotation matrix may be formed by taking into consideration pairwise rotation as in Equation 5 and may be formed by taking into consideration pair rotation plus reflection as in Equation 6.

Furthermore, the error parameter indicates a variable or matrix for calculating the approximation of a target transform, and may be denoted as an "error calculation method" or "weight matrix" or the like. The error parameter may be determined based on Equation 11, Equation 14 or Equation 26.

As described in FIG. 10, the permutation layer may be derived through an optimization process. The optimization process may be performed based on matching between a layered Givens transform matrix and the given transform matrix H. In this case, the layered Givens transform matrix may be derived from the rotation layer and the permutation layer using Equation 3. Furthermore, the optimization process of the permutation layer may be performed using the Hungarian algorithm. Specifically, the encoder may determine optimal assignment not overlapped between nodes using Equation 16.

As described in FIG. 11, the rotation layer or the permutation layer may be derived through an optimization process. The optimization process may be performed based on matching between a layered Givens transform matrix and the given transform matrix H. Specifically, the optimization process of the rotation layer may be performed by determining an optimal rotation angle of a rotation matrix within the rotation layer based on the matching between the layered Givens transform matrix and the given transform matrix H and determining non-overlapped pairs that maximize a total sum of gains determined based on the optimal rotation angle. As described in Equation 25, the encoder may search for a maximum matching pair of non-overlapped edges using the blossom algorithm.

Furthermore, the optimization process of the rotation layer may further include the step of setting at least one different rotation layer within the layered Givens transform matrix as an identity matrix. As described above in the simulated annealing algorithm, a global optimal value may be retrieved while comparing a newly derived optimal value with the existing optimal value through the initialization of neighbor layers.

The encoder obtains a layered Givens transform (LGT) coefficient based on the rotation layer and the permutation layer (S1902).

As described in FIG. 5, a layered Givens transform coefficient may be obtained by applying the rotation layer and the permutation layer to input data arranged in lexicographic order.

The encoder performs quantization and entropy encoding on the layered Givens transform (LGT) coefficient (S1903).

FIG. 20 is an embodiment to which the present invention is applied and is a flowchart for illustrating a process of performing decoding a layered Givens transform.

The decoder obtains a layered Givens transform (LGT) coefficient by performing entropy decoding and dequantization on a residual signal included in a video signal received from the encoder (S2001).

The decoder derives at least one rotation layer and permutation layer based on a given transform matrix H and an error parameter (S2002). As described above, the permutation layer may include a permutation matrix obtained by substituting a row of an identity matrix. Furthermore, the rotation layer may include a permutation matrix and a rotation matrix. The rotation matrix may include at least one pairwise rotation matrix.

As described above, the pairwise rotation matrix may be formed by taking into consideration pairwise rotation as in Equation 5, and may be formed by taking into consideration pair rotation plus reflection as in Equation 6.

Furthermore, the error parameter may be determined based on Equation 11, Equation 14 or Equation 26.

As described in FIG. 10, the permutation layer may be derived through an optimization process. The optimization process may be performed based on matching between a layered Givens transform matrix and the given transform matrix H. In this case, the layered Givens transform matrix may be derived from the rotation layer and the permutation layer using Equation 3. Furthermore, the optimization process of the permutation layer may be performed using the Hungarian algorithm. Specifically, the decoder may determine optimal assignment not overlapped between nodes using Equation 16.

As described in FIG. 11, the rotation layer or the permutation layer may be derived through an optimization process. The optimization process may be performed based on matching between a layered Givens transform matrix and the given transform matrix H. Specifically, the optimization process of the rotation layer may be performed by determining an optimal rotation angle of a rotation matrix within the rotation layer based on the matching between the layered Givens transform matrix and the given transform matrix H and determining non-overlapped pairs that maximize a total sum of gains determined based on the optimal rotation angle. As described in Equation 25, the decoder may search for a maximum matching pair of non-overlapped edges using the blossom algorithm.

Furthermore, the optimization process of the rotation layer may further include the step of setting at least one different rotation layer within the layered Givens transform matrix as an identity matrix. As described above in the simulated annealing algorithm, a global optimal value may be retrieved while comparing a newly derived optimal value with the existing optimal value through the initialization of neighbor layers.

The decoder performs an inverse transform on the layered Givens transform (LGT) coefficient based on the rotation layer and the permutation layer (S2003). The decoder reconstructs the video signal using the inverse-transformed coefficient (S2004).

Referring to FIG. 19, the step of deriving the LGT and the step of obtaining the LGT coefficient by applying the derived LGT may be included in the encoding process. Referring to FIG. 20, the step of deriving the LGT and the step of performing the inverse transform using the derived LGT may be included in the decoding process.

Meanwhile, in an embodiment of the present invention, an optimal LGT may be derived off-line using the above-described method. In this case, the encoder/decoder may select the offline derived optimal LGT based on a prediction mode or context, and may perform encoding/decoding using the selected LGT. Alternatively, the encoder may perform encoding on the offline derived optimal LGT based on rate-distortion optimization (RDO), and may signal, to the decoder, information related to the selected LGT. The decoder may perform decoding using the offline derived optimal LGT and LGT-related information received from the encoder.

FIG. 21 is a diagram illustrating, more specifically, a decoder to which the present invention is applied.

Referring to FIG. 21, the decoder 200 implements the functions, processes and/or methods proposed in FIGS. 2 to 20. Specifically, the decoder 200 may be configured to include an entropy decoding unit 2101, a dequantization unit 2102, a layer derivation unit 2103, an inverse transform unit 2104 and a reconstruction unit 2105. In FIG. 21, the layer derivation unit 2103 has been illustrated as being an element separated from the inverse transform unit 2104, but the layer derivation unit 2103 may be implemented as an element included in the inverse transform unit 2104.

The entropy decoding unit 2101 and the dequantization unit 2102 obtain a layered Givens transform coefficient by performing entropy decoding and dequantization on a residual signal included in a video signal received from an encoder.

The layer derivation unit 2103 derives at least one rotation layer and permutation layer based on a given transform matrix H and an error parameter (S2002). As described above, the permutation layer may include a permutation matrix obtained by substituting a row of an identity matrix. Furthermore, the rotation layer may include a permutation matrix and a rotation matrix, and the rotation matrix may include at least one pairwise rotation matrix.

As described above, the pairwise rotation matrix may be formed by taking into consideration pairwise rotation as in Equation 5 and may be formed by taking into consideration pair rotation plus reflection as in Equation 6.

Furthermore, the error parameter may be determined based on Equation 11, Equation 14 or Equation 26.

As described in FIG. 10, the permutation layer may be derived through an optimization process. The optimization process may be performed based on matching between a layered Givens transform matrix and the given transform matrix H. In this case, the layered Givens transform matrix may be derived from the rotation layer and the permutation layer using Equation 3. Furthermore, the optimization process of the permutation layer may be performed using the Hungarian algorithm. Specifically, the layer derivation unit 2103 may determine optimal assignment not overlapped between nodes using Equation 16.

As described in FIG. 11, the rotation layer or the permutation layer may be derived through an optimization process. The optimization process may be performed based on the matching between the layered Givens transform matrix and the given transform matrix H. Specifically, the optimization process of the rotation layer may be performed by determining an optimal rotation angle of a rotation matrix within the rotation layer based on the matching between the layered Givens transform matrix and the given transform matrix H and determining non-overlapped pairs that maximize a total sum of gains determined based on the optimal rotation angle. As described in Equation 25, the layer derivation unit 2103 may search for a maximum matching pair of non-overlapped edges using the blossom algorithm.

Furthermore, the optimization process of the rotation layer may further include the step of setting at least one different rotation layer within the layered Givens transform matrix as an identity matrix. As described in the simulated annealing algorithm, a global optimal value may be retrieved while comparing a newly derived optimal value with the existing optimal value through the initialization of neighbor layers.

The inverse transform unit 2104 performs an inverse transform on a layered Givens transform (LGT) coefficient based on the rotation layer and the permutation layer. The reconstruction unit 2105 reconstructs the video signal using the inverse-transformed coefficient.

As described above, the embodiments explained in the present invention may be implemented and performed in a processor, a micro-processor, a controller or a chip. For example, the functional modules explained in FIGS. 1, 2 and 4 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus, and may be used to code video signals and data signals.

Furthermore, the decoding/encoding method to which the present invention is applied may be produced in the form of a program to be executed by a computer, and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a blue ray disk (BD), a USB, ROM, RAM, CD-ROM, a magnetic tape, a floppy disk, and an optical data storage device, for example. Furthermore, the computer-readable recording median includes media implemented in the form of carrier waves (e.g., transmission through the Internet). Furthermore, a bit stream generated by the encoding method may be stored in a computer-readable recording medium or may be transmitted over a wired/wireless communication network.

INDUSTRIAL APPLICABILITY

The exemplary embodiments of the present invention have been disclosed for illustrative purposes, and those skilled in the art may improve, change, replace or add various other embodiments within the technical spirit and scope of the present invention disclosed in the attached claims.

The invention claimed is:

1. A method of performing a transform using a layered Givens transform, comprising:
  deriving at least one rotation layer and permutation layer based on a given transform matrix H and error parameter;
  obtaining a layered Givens transform (LGT) coefficient based on the rotation layer and the permutation layer; and
  performing quantization and entropy encoding on the LGT coefficient,
  wherein the permutation layer comprises a permutation matrix obtained by substituting a row of an identity matrix.

2. The method of claim 1,
  wherein the rotation layer comprises a permutation matrix and a rotation matrix, and
  wherein the rotation matrix comprises at least one pairwise rotation matrix.

3. The method of claim 1,
  wherein the rotation layer or the permutation layer are derived through an optimization process,
  wherein the optimization process is performed based on matching between a layered Givens transform (LGT) matrix and the given transform matrix H, and
  wherein the layered Givens transform (LGT) matrix is derived using the rotation layer and the permutation layer.

4. The method of claim 3,
  wherein the optimization process of the permutation layer is performed using a Hungarian algorithm.

5. The method of claim 3,
  wherein the optimization process of the rotation layer comprises:
  determining an optimal rotation angle of a rotation matrix within the rotation layer based on the matching between the LGT matrix and the given transform matrix H; and
  determining non-overlapped pairs maximizing a total sum of gains determined based on the optimal rotation angle.

6. The method of claim 5,
  wherein the non-overlapped pairs maximizing the total sum of gains are determined using a blossom algorithm.

7. The method of claim 5,
  wherein the optimization process of the rotation layer further comprises setting at least one different rotation layer within the LGT matrix as an identity matrix.

8. The method of claim 1,
  wherein obtaining the LGT coefficient comprises obtaining the LGT coefficient by applying the rotation layer and the permutation layer to input data arranged in lexicographic order.

9. A method of performing an inverse transform using a layered Givens transform, comprising:
  obtaining a layered Givens transform (LGT) coefficient by performing entropy decoding and dequantization on a residual signal included in a video signal;
  deriving at least one rotation layer and permutation layer based on a given transform matrix H and error parameter;
  performing an inverse transform on the LGT coefficient based on the rotation layer and the permutation layer; and
  reconstructing the video signal using the inverse-transformed coefficient,
  wherein the permutation layer comprises a permutation matrix obtained by substituting a row of an identity matrix.

10. The method of claim 9,
  wherein the rotation layer comprises a permutation matrix and a rotation matrix, and
  wherein the rotation matrix comprises at least one pairwise rotation matrix.

11. The method of claim 9,
  wherein the rotation layer or the permutation layer are derived through an optimization process,
  wherein the optimization process is performed based on matching between a layered Givens transform (LGT) matrix and the given transform matrix H, and
  wherein the layered Givens transform (LGT) matrix is derived using the rotation layer and the permutation layer.

12. The method of claim 11,
  wherein the optimization process of the permutation layer is performed using a Hungarian algorithm.

13. The method of claim 11, wherein the optimization process of the rotation layer comprises:

determining an optimal rotation angle of a rotation matrix within the rotation layer based on the matching between the LGT matrix and the given transform matrix H; and determining non-overlapped pairs maximizing a total sum of gains determined based on the optimal rotation angle.

14. The method of claim 13, wherein the non-overlapped pairs maximizing the total sum of gains are determined using a blossom algorithm.

15. The method of claim 13, wherein the optimization process of the rotation layer further comprises setting at least one different rotation layer within the LGT matrix as an identity matrix.

16. An apparatus performing an inverse transform using a layered Givens transform, comprising:

an entropy decoding unit configured to perform entropy-decode a residual signal included in a video signal;

a dequantization unit configured to obtain a layered Givens transform (LGT) coefficient by dequantizing the entropy-decoded residual signal;

a layer derivation unit configured to derive at least one rotation layer and permutation layer based on a given transform matrix H and error parameter;

an inverse transform unit configured to perform an inverse transform on the LGT coefficient based on the rotation layer and the permutation layer; and a reconstruction unit configured to reconstruct the video signal using the inverse-transformed coefficient, wherein the permutation layer comprises a permutation matrix obtained by substituting a row of an identity matrix.

* * * * *